United States Patent
Chikugo et al.

(10) Patent No.: US 10,305,127 B2
(45) Date of Patent: May 28, 2019

(54) WET STATE CONTROL METHOD FOR FUEL CELL SYSTEM AND WET STATE CONTROL DEVICE FOR THE SAME

(71) Applicant: NISSAN MOTOR CO., LTD., Yokohama-shi, Kanagawa (JP)

(72) Inventors: Hayato Chikugo, Kanagawa (JP); Yousuke Tomita, Kanagawa (JP); Tetsuya Aoki, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/084,345

(22) PCT Filed: Dec. 8, 2016

(86) PCT No.: PCT/JP2016/086636
§ 371 (c)(1),
(2) Date: Sep. 12, 2018

(87) PCT Pub. No.: WO2017/158957
PCT Pub. Date: Sep. 21, 2017

(65) Prior Publication Data
US 2019/0081340 A1    Mar. 14, 2019

(30) Foreign Application Priority Data

Mar. 15, 2016  (JP) .................. 2016-051340

(51) Int. Cl.
*H01M 8/04746* (2016.01)
*H01M 8/04492* (2016.01)
*H01M 8/04701* (2016.01)
*H01M 8/04828* (2016.01)

(52) U.S. Cl.
CPC ... *H01M 8/04776* (2013.01); *H01M 8/04492* (2013.01); *H01M 8/04738* (2013.01); *H01M 8/04768* (2013.01); *H01M 8/04783* (2013.01); *H01M 8/04828* (2013.01)

(58) Field of Classification Search
None
See application file for complete search history.

(56) References Cited

U.S. PATENT DOCUMENTS

| | | | |
|---|---|---|---|
| 2014/0093796 A1 | 4/2014 | Aoki et al. |
| 2015/0162629 A1 | 6/2015 | Tomita et al. |
| 2015/0171444 A1 | 6/2015 | Tanaka |
| 2015/0349358 A1 | 12/2015 | Takeda et al. |

(Continued)

FOREIGN PATENT DOCUMENTS

| | | |
|---|---|---|
| EP | 2 720 306 A1 | 4/2014 |
| JP | 2007-257956 A | 10/2007 |
| JP | 2010-114039 A | 5/2010 |

(Continued)

*Primary Examiner* — Sarah A. Slifka
(74) *Attorney, Agent, or Firm* — Foley & Lardner LLP

(57) ABSTRACT

Provided is a wet state control method for a fuel cell system in which cathode gas is supplied to a fuel cell while the cathode gas partially bypasses the fuel cell, the wet state control method being for controlling a wet state of the fuel cell by adjusting wet control parameters including a bypass valve opening degree, a cathode gas pressure, and a cathode gas flow rate. When the fuel cell is controlled to a wet side, at least either one of the cathode gas flow rate and the cathode gas pressure is adjusted in priority to adjustment of the bypass valve opening degree.

13 Claims, 21 Drawing Sheets

(56) References Cited

U.S. PATENT DOCUMENTS

2015/0372328 A1  12/2015  Taruya et al.

FOREIGN PATENT DOCUMENTS

| JP | 2012-252939 A | 12/2012 |
| JP | 5834594 B2 | 12/2015 |
| JP | 2016-9518 A | 1/2016 |
| WO | WO 2013/150651 A1 | 10/2013 |
| WO | WO 2013/187514 A1 | 12/2013 |
| WO | WO 2014/103589 A1 | 7/2014 |

| WET OPERATION | | |
|---|---|---|
| WET CONTROL PRIORITY | WET CONTROL PARAMETER (OPERATION PARAMETER) | INCREASE/ DECREASE |
| 1 | COMPRESSOR FLOW RATE (COMPRESSOR OUTPUT) | DECREASE (DECREASE) |
| 2 | CATHODE GAS PRESSURE (CATHODE PRESSURE CONTROL VALVE OPENING DEGREE) | INCREASE (DECREASE) |
| 3 | BYPASS FLOW RATE (BYPASS VALVE OPENING DEGREE) | INCREASE (INCREASE) |

FIG. 17

| DRY OPERATION | | |
|---|---|---|
| DRY CONTROL PRIORITY | WET CONTROL PARAMETER (OPERATION PARAMETER) | INCREASE/ DECREASE |
| 1 | BYPASS FLOW RATE (BYPASS VALVE OPENING DEGREE) | DECREASE (DECREASE) |
| 2 | CATHODE GAS PRESSURE (CATHODE PRESSURE CONTROL VALVE OPENING DEGREE) | DECREASE (INCREASE) |
| 3 | COMPRESSOR FLOW RATE (COMPRESSOR OUTPUT) | INCREASE (INCREASE) |

FIG. 20

WET STATE CONTROL METHOD FOR FUEL CELL SYSTEM AND WET STATE CONTROL DEVICE FOR THE SAME

TECHNICAL FIELD

The present invention relates to a wet state control method for a fuel cell system and a wet state control device for the same.

BACKGROUND ART

There has been known a fuel cell system in which cathode gas supplied from a compressor to a cathode system is partially introduced into a bypass passage so as to bypass a fuel cell. JP 2010-114039 A discloses one example of such a fuel cell system.

SUMMARY OF INVENTION

In the fuel cell system of JP 2010-114039 A, even if a compressor operates as intended according to a load of a fuel cell, a pressure and a flow rate of a cathode system may change differently from a request of the load, from various viewpoints such as dilution of anode off-gas and prevention of turbo surge. This might result in that a cathode gas flow rate to be supplied to the fuel cell is not maintained appropriately and a wet state of the fuel cell is not kept suitably.

The present invention has been accomplished in consideration of such a problem, and an object of the present invention is to provide a wet state control method for a fuel cell system and a wet state control device for the same each of which can control a wet state of a fuel cell more suitably.

According to an aspect of the present invention, a wet state control method for a fuel cell system in which cathode gas is supplied to a fuel cell while the cathode gas partially bypasses the fuel cell is provided. The wet state control method is for controlling a wet state of the fuel cell by adjusting wet control parameters. The wet control parameters include at least a bypass valve opening degree, a cathode gas pressure, and a cathode gas flow rate. In particular, the method includes controlling the fuel cell to a wet side such that at least either one of the cathode gas flow rate and the cathode gas pressure is adjusted in priority to adjustment of the bypass valve opening degree.

BRIEF DESCRIPTION OF DRAWINGS

FIG. 17 is a table illustrating a relationship between the priorities of the wet control parameters in the wet operation and increase/decrease tendencies of the wet control parameters.

FIG. 20 is a table illustrating a relationship between priorities of the wet control parameters in the dry operation and increase/decrease tendencies of the wet control parameters.

DESCRIPTION OF EMBODIMENTS

With reference to the attached drawings, the following describes an embodiment of the present invention.

Figure 1:
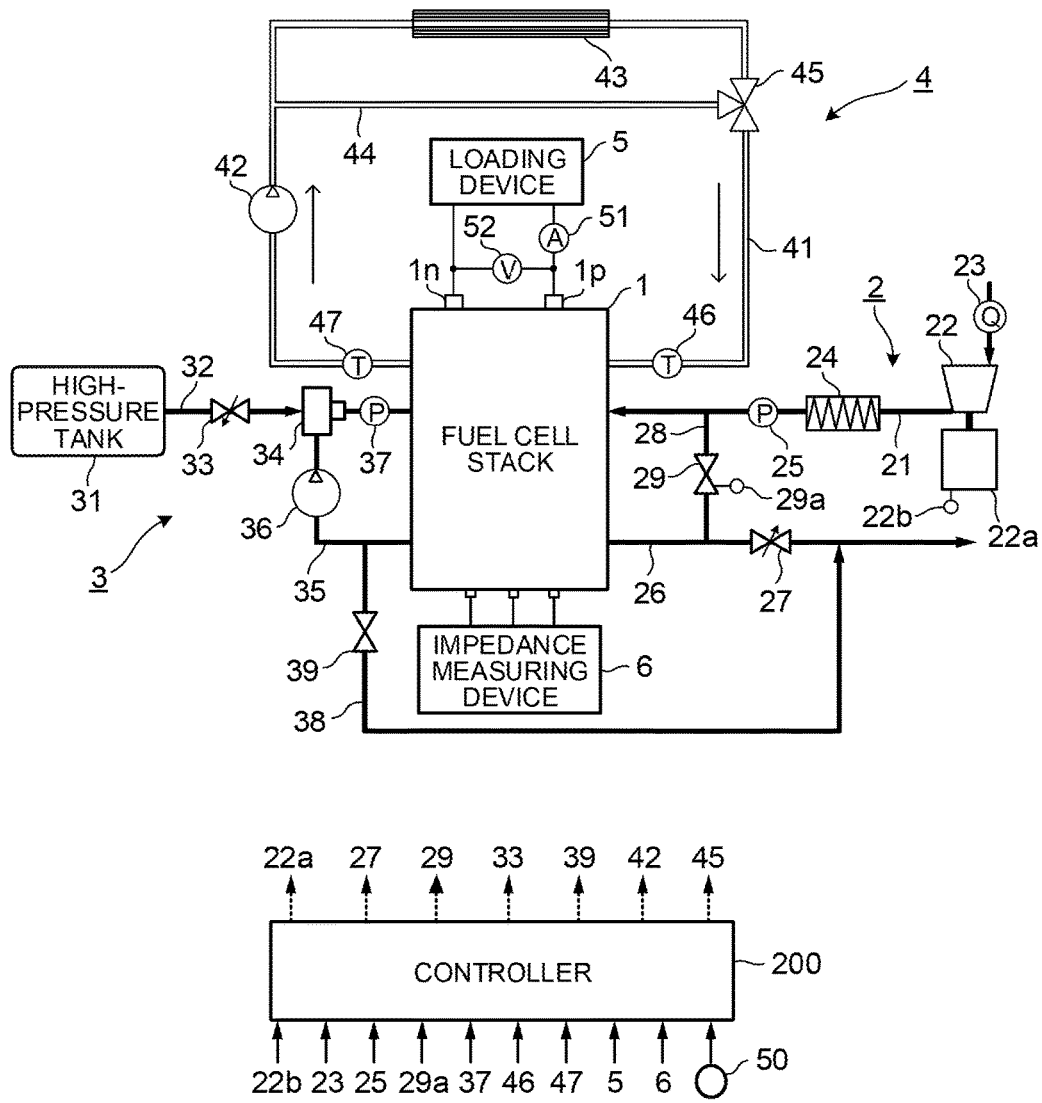
FIG. 1 is a view illustrating a configuration of a fuel cell system in an embodiment of the present invention.

FIG. 1 is a configuration diagram illustrating one example of a configuration of a fuel cell system 100 in the embodiment of the present invention.

The fuel cell system 100 illustrated in the figure constitutes a power supply system for causing a fuel cell to generate electric power according to an electric load by supplying anode gas (fuel) and cathode gas (air) necessary for power generation to a fuel cell stack 1 as the fuel cell from its outside.

The fuel cell system 100 includes the fuel cell stack 1, a cathode gas supply/discharge device 2, an anode gas supply/discharge device 3, a stack cooling device 4, a loading device 5, an impedance measuring device 6, and a controller 200.

As described above, the fuel cell stack 1 is a laminated cell in which a plurality of fuel cells is laminated. The fuel cell stack 1 is connected to the loading device 5 and supplies electric power to the loading device 5. The fuel cell stack 1 causes a direct-current voltage of several hundred volts (V), for example. Further, the fuel cell constituting the fuel cell stack 1 is mainly constituted by an electrolyte membrane, an anode electrode and a cathode electrode. Here, the electrolyte membrane shows a good electrical conduction property with an appropriate degree of wetness (moisture content). In the following description, a wet state of the electrolyte membrane in each fuel cell is referred to as a "wet state of the fuel cell stack 1" or a "wet state of the fuel cell," or just referred to as a "wet state."

The cathode gas supply/discharge device 2 is a device configured to supply cathode gas to the fuel cell stack 1 and to discharge, to the atmosphere, cathode off-gas discharged from the fuel cell stack 1.

The cathode gas supply/discharge device 2 includes a cathode gas supply passage 21, a compressor 22, an air flow meter 23, an intercooler 24, a cathode pressure sensor 25, a cathode gas discharge passage 26, a cathode pressure control valve 27, a bypass passage 28, and a bypass valve 29.

The cathode gas supply passage 21 is a passage via which the cathode gas is supplied to the fuel cell stack 1. One end of the cathode gas supply passage 21 is opened and the other end thereof is connected to a cathode gas inlet hole of the fuel cell stack 1.

The compressor 22 supplies air including oxygen to a cathode system including the cathode gas supply passage 21, the fuel cell stack 1, the bypass passage 28, and the cathode gas discharge passage 26. The compressor 22 is provided in an open end at the one end of the cathode gas supply passage 21.

Further, the compressor 22 is driven by a compressor motor 22a so as to take the air into the fuel cell system 100 from the open end of the cathode gas supply passage 21, so that the air is supplied to the fuel cell stack 1 via the cathode gas supply passage 21. A rotation speed of the compressor motor 22a, that is, an output (hereinafter also referred to as a compressor output) of the compressor 22 is controlled by the controller 200.

More specifically, the compressor motor 22a is provided with a rotation number sensor 22b for detecting the rotation speed thereof. The rotation number sensor 22b outputs a detection signal of the rotation speed of the compressor motor 22a to the controller 200. Based on the detection signal from the rotation number sensor 22b, the controller 200 adjusts the rotation speed of the compressor motor 22a, that is, the output of the compressor 22. Note that the compressor 22 can be constituted by a turbo compressor or a displacement-type compressor, for example.

The air flow meter 23 is provided in an inlet of the compressor 22. The air flow meter 23 functions as a cathode gas flow rate acquiring portion for detecting a flow rate of the cathode gas to be supplied to the cathode gas supply passage 21. In the following description, the flow rate of the cathode gas is also referred to as a "compressor flow rate." The air flow meter 23 outputs a detection signal of the compressor flow rate to the controller 200.

The intercooler 24 cools down the air discharged from the compressor 22 to the cathode gas supply passage 21 and sent to the fuel cell stack 1.

In the cathode gas supply passage 21, the cathode pressure sensor 25 is provided between the intercooler 24 and the fuel cell stack 1 and on the upstream side from a junction between the cathode gas supply passage 21 and the bypass passage 28. The cathode pressure sensor 25 detects a pressure of the cathode gas in the cathode gas discharge passage 26. In the following description, the pressure of the cathode gas in the cathode gas discharge passage 26 is also referred to as a "cathode gas pressure." The cathode pressure sensor 25 outputs a detection signal of the cathode gas pressure to the controller 200.

The cathode gas discharge passage 26 is a passage via which cathode off-gas is discharged from the fuel cell stack 1. One end of the cathode gas discharge passage 26 is connected to a cathode gas outlet hole of the fuel cell stack 1 and the other end thereof is opened.

The cathode pressure control valve 27 adjusts a pressure of the cathode gas system. In the cathode gas discharge passage 26, the cathode pressure control valve 27 is provided on the downstream side from a junction between the cathode gas discharge passage 26 and the bypass passage 28. As the cathode pressure control valve 27, a solenoid valve configured such that its valve opening degree is gradually changeable is used, for example. The cathode pressure control valve 27 is controlled by the controller 200 so as to be opened and closed. The cathode gas pressure is adjusted to a desired pressure by the opening/closing control. As the opening degree of the cathode pressure control valve 27 becomes larger, the cathode pressure control valve 27 is opened, and as the opening degree of the cathode pressure control valve 27 becomes smaller, the cathode pressure control valve 27 is closed. Note that, in the cathode gas discharge passage 26, the cathode pressure control valve 27 may be provided on the upstream side from the junction between the cathode gas discharge passage 26 and the bypass passage 28.

The bypass passage 28 is a passage via which a part of the cathode gas from the compressor 22 bypasses the fuel cell stack 1. In the present embodiment, the bypass passage 28 is connected to a part, on the downstream side from the cathode pressure sensor 25, in the cathode gas supply passage 21 and a part, on the upstream side from the cathode pressure control valve 27, in the cathode gas discharge passage 26.

The bypass valve 29 is provided in the bypass passage 28. The bypass valve 29 is a valve for adjusting a cathode gas flow rate (hereinafter also referred to as a "bypass flow rate") to be supplied to the cathode gas discharge passage 26 by bypassing the fuel cell stack 1 and is configured such that an opening degree can be continuously adjusted by the controller 200. Note that, in the following description, a supply flow rate of the cathode gas (a fuel cell supply flow rate) to the fuel cell stack 1, obtained by subtracting the bypass flow rate from the compressor flow rate, is also referred to as a "stack supply flow rate."

Further, the bypass valve 29 is provided with an opening degree sensor 29a for detecting its opening degree. The opening degree sensor 29a outputs a detection signal of the opening degree (hereinafter just referred to as a "bypass valve opening degree") of the bypass valve 29 to the controller 200.

The anode gas supply/discharge device 3 is a device configured to supply anode gas to the fuel cell stack 1 and to introduce, into the fuel cell stack 1 in a circulated manner, anode off-gas discharged from the fuel cell stack 1.

The anode gas supply/discharge device 3 includes a high-pressure tank 31, an anode gas supply passage 32, an anode pressure control valve 33, an ejector 34, an anode gas circulation passage 35, an anode gas circulation blower 36, an anode pressure sensor 37, a purge passage 38, and a purge valve 39.

The high-pressure tank 31 is configured such that the anode gas to be supplied to the fuel cell stack 1 is kept in a high-pressure state and is stored therein.

The anode gas supply passage 32 is a passage via which the anode gas stored in the high-pressure tank 31 is supplied to the fuel cell stack 1. One end of the anode gas supply passage 32 is connected to the high-pressure tank 31 and the other end thereof is connected to an anode gas inlet hole of the fuel cell stack 1 via the ejector 34.

The anode pressure control valve 33 adjusts a pressure of the anode gas supply passage 32 constituting a fuel system. The anode pressure control valve 33 is provided in the anode gas supply passage 32 between the high-pressure tank 31 and the ejector 34. When an opening degree of the anode pressure control valve 33 is changed, a pressure of the anode gas to be supplied to the fuel cell stack 1 is increased or decreased.

As the anode pressure control valve 33, a solenoid valve configured such that its valve opening degree is gradually changeable is used, for example. The anode pressure control valve 33 is controlled by the controller 200 so as to be opened and closed. The pressure of the anode gas to be supplied to the fuel cell stack 1 is adjusted by the opening/closing control.

The ejector 34 is provided in the anode gas supply passage 32 between the anode pressure control valve 33 and the fuel cell stack 1. The ejector 34 is a mechanical pump provided in a part where the anode gas circulation passage 35 is joined to the anode gas supply passage 32.

The anode gas circulation passage 35 is a passage constituting the fuel system and is connected to the anode gas supply passage 32 via a suction port of the ejector 34.

The anode gas circulation blower 36 is provided on the upstream side from the ejector 34 in the anode gas circulation passage 35. The anode gas circulation blower 36 circulates the anode off-gas to the fuel cell stack 1 via the ejector 34. A rotation speed of the anode gas circulation blower 36 is controlled by the controller 200. Hereby, a flow rate of the anode gas circulating through the anode gas circulation passage 35 is adjusted. In the following description, the flow rate of the anode gas circulating to the fuel cell stack 1 is also referred to as an "anode gas circulation flow rate."

The anode pressure sensor 37 is provided in the anode gas supply passage 32 between the ejector 34 and the fuel cell stack 1. The anode pressure sensor 37 detects the pressure of the anode gas to be supplied to the fuel cell stack 1. In the following description, the pressure of the anode gas to be supplied to the fuel cell stack 1 is also just referred to as an "anode gas pressure." The anode pressure sensor 37 outputs a signal of a detected anode gas pressure to the controller 200.

The purge passage 38 branches off from the anode gas circulation passage 35 so as to be joined to the cathode gas discharge passage 26 on the downstream side from the cathode pressure control valve 27. The purge passage 38 is a passage via which impurities such as nitrogen gas included in the anode off-gas and water produced by power generation are discharged to the outside. Hereby, the anode off-gas discharged via the purge passage 38 is mixed with the cathode off-gas in the cathode gas discharge passage 26, so that a hydrogen concentration in the mixed gases is maintained at a predetermined value or less.

The purge valve 39 is provided in the purge passage 38. The purge valve 39 adjusts an amount of the impurities to be discharged via the purge passage 38 according to an opening degree of the purge valve 39. The opening degree of the purge valve 39 is controlled by the controller 200.

Note that a gas/liquid separator may be provided in a junction between the anode gas circulation passage 35 and the purge passage 38, so that the impurities are divided into a liquid component and a gas component such that the liquid component is discharged from a discharge system (not shown) to outside the system and only the gas component is introduced into the purge passage 38.

The stack cooling device 4 is a device for cooling a temperature of the fuel cell stack 1. The stack cooling device 4 includes a coolant circulation passage 41, a coolant pump 42, a radiator 43, a coolant bypass passage 44, a three-way valve 45, an inlet coolant temperature sensor 46, and an outlet coolant temperature sensor 47.

The coolant circulation passage 41 is a passage through which a coolant is circulated to the fuel cell stack 1. One end of the coolant circulation passage 41 is connected to a coolant inlet hole of the fuel cell stack 1 and the other end thereof is connected to a coolant outlet hole of the fuel cell stack 1.

The coolant pump 42 is provided in the coolant circulation passage 41. The coolant pump 42 supplies the coolant to the fuel cell stack 1 via the radiator 43. A rotation speed of the coolant pump 42 is controlled by the controller 200.

The radiator 43 is provided on the downstream side from the coolant pump 42 in the coolant circulation passage 41. The radiator 43 cools down, by a fan, the coolant heated inside the fuel cell stack 1.

The coolant bypass passage 44 is a passage that bypasses the radiator 43 and is a passage through which the coolant discharged from the fuel cell stack 1 is returned to the fuel cell stack 1 in a circulated manner. One end of the coolant bypass passage 44 is connected between the coolant pump 42 and the radiator 43 in the coolant circulation passage 41, and the other end thereof is connected to one end of the three-way valve 45.

The three-way valve 45 adjusts a temperature of the coolant to be supplied to the fuel cell stack 1. The three-way valve 45 is realized by a thermostat, for example. The three-way valve 45 is provided in a part where the coolant bypass passage 44 is joined to the coolant circulation passage 41 between the radiator 43 and the coolant inlet hole of the fuel cell stack 1.

The inlet coolant temperature sensor 46 and the outlet coolant temperature sensor 47 detect the temperature of the coolant. The temperature of the coolant is used as a temperature of the fuel cell stack 1 or a temperature of the cathode gas.

The inlet coolant temperature sensor 46 is provided in the coolant circulation passage 41 at a position near the coolant inlet hole formed in the fuel cell stack 1. The inlet coolant temperature sensor 46 detects a temperature of the coolant to flow into the coolant inlet hole of the fuel cell stack 1. In the following description, the temperature of the coolant to flow into the coolant inlet hole of the fuel cell stack 1 is referred to as a "stack inlet coolant temperature." The inlet coolant temperature sensor 46 outputs a detection signal of the stack inlet coolant temperature to the controller 200.

The outlet coolant temperature sensor 47 is provided in the coolant circulation passage 41 at a position near the coolant outlet hole formed in the fuel cell stack 1. The outlet coolant temperature sensor 47 detects a temperature of the coolant discharged from the fuel cell stack 1. In the following description, the temperature of the coolant discharged from the fuel cell stack 1 is referred to as a "stack outlet coolant temperature." The outlet coolant temperature sensor 47 outputs a detection signal of the stack outlet coolant temperature to the controller 200.

In the present embodiment, an average value of respective detection values of the inlet coolant temperature sensor 46 and the outlet coolant temperature sensor 47 is calculated by the controller 200. The average value is used as a stack temperature. Note that the stack temperature is not limited to the average value of the detection values of the inlet coolant temperature sensor 46 and the outlet coolant temperature sensor 47, and the controller 200 may acquire, as the stack temperature, a smaller one or a larger one of the detection values of the inlet coolant temperature sensor 46 and the outlet coolant temperature sensor 47, for example.

The loading device 5 is driven by receiving generated electric power supplied from the fuel cell stack 1. The loading device 5 may be an electric motor for driving a vehicle, a control unit for controlling the electric motor, accessories for assisting power generation of the fuel cell stack 1, and the like, for example. The accessories of the fuel cell stack 1 may be the compressor 22, the anode gas circulation blower 36, the coolant pump 42, and the like, for example.

Note that the control unit for controlling the loading device 5 outputs electric power necessary for operation of the loading device 5 to the controller 200 as electric power requested to the fuel cell stack 1. For example, as a stepping amount of an accelerator pedal provided in the vehicle becomes larger, requested electric power of the loading device 5 becomes larger. In the present embodiment, the requested electric power of the loading device 5 corresponds to a request load.

A current sensor 51 and a voltage sensor 52 are placed between the loading device 5 and the fuel cell stack 1.

The current sensor 51 is connected to a power-source line between a positive terminal 1p of the fuel cell stack 1 and a positive terminal of the loading device 5. The current sensor 51 detects a current output from the fuel cell stack 1 to the loading device 5. In the following description, the current output from the fuel cell stack 1 to the loading device 5 is also referred to as a "stack output current." The current sensor 51 outputs a detection signal of the stack output current to the controller 200.

The voltage sensor 52 is connected between the positive terminal 1p and a negative terminal 1n of the fuel cell stack 1. The voltage sensor 52 detects a terminal-to-terminal voltage that is a voltage between the positive terminal 1p and a negative terminal 1n. In the following description, the terminal-to-terminal voltage of the fuel cell stack 1 is referred to as a "stack output voltage." The voltage sensor 52 outputs a detection signal of the stack output voltage to the controller 200.

The impedance measuring device 6 functions as a wet-state acquisition device for acquiring the wet state of the electrolyte membrane. The impedance measuring device 6 is connected to the fuel cell stack 1 and measures an internal impedance of the fuel cell stack 1 that has a correlation with the wet state of the electrolyte membrane.

Generally, as the moisture content (moisture) of the electrolyte membrane decreases, that is, as the electrolyte membrane becomes drier, the internal impedance becomes larger. In the meantime, as the moisture content of the electrolyte membrane increases, that is, as the electrolyte membrane becomes wetter, the internal impedance becomes smaller. On this account, in the present embodiment, the internal impedance of the fuel cell stack 1 is used as a parameter indicative of the wet state of the electrolyte membrane.

The impedance measuring device 6 supplies an alternating current having a high frequency suitable to detect an electric resistance of the electrolyte membrane, for example, and calculates an internal impedance by dividing the amplitude of an alternating voltage to be output by the amplitude of the alternating current.

In the following description, the internal impedance calculated based on the alternating voltage and the alternating current at the high frequency is also referred to as an HFR (a high frequency resistance). The impedance measuring device 6 outputs an HFR value thus calculated to the controller 200 as an HFR measured value.

The controller 200 is constituted by a microcomputer including a central processing unit (CPU), a read only memory (ROM), a random access memory (RAM), and an input-output interface (I/O interface).

The controller 200 acquires, as input signals, at least detection signals from the impedance measuring device 6, the rotation number sensor 22b, the air flow meter 23, the cathode pressure sensor 25, the opening degree sensor 29a, the anode pressure sensor 37, the inlet coolant temperature sensor 46, the outlet coolant temperature sensor 47, and an atmospheric pressure sensor 50, a request load from the loading device 5, and the like.

Particularly, in the present embodiment, the controller 200 operates the compressor 22 (the compressor motor 22a), the cathode pressure control valve 27, and the bypass valve 29 based on the input signals, so as to adjust the compressor flow rate, the cathode gas pressure, and the bypass valve opening degree (the bypass flow rate). Further, the controller 200 adjusts the opening degree of the anode pressure control valve 33 and the output of the anode gas circulation blower 36, so as to control the anode gas flow rate and the anode gas pressure. Further, the controller 200 controls the temperature of the fuel cell stack 1 by adjusting the output of the coolant pump 42 and the opening degree of the three-way valve 45 according to a parameter related to an operating state of the fuel cell system 100.

Particularly, in the present embodiment, the controller 200 performs a wet control to adjust the compressor flow rate, the cathode gas pressure, and the bypass valve opening degree so that the wet state of the fuel cell stack 1 is maintained to a state suitable for power generation.

That is, in the wet control of the present embodiment, the controller 200 controls mainly three wet control parameters, i.e., the compressor flow rate, the cathode gas pressure, and the bypass valve opening degree. That is, actuators controlled by the controller 200 in the wet control are the compressor 22, the cathode pressure control valve 27, and the bypass valve 29.

Further, in the present embodiment, the wet control performed by the controller 200 includes a "dry operation" that is an operation to shift the wet state of the fuel cell stack 1 to a dry side so as to reduce redundant moisture in the electrolyte membrane, and a "wet operation" to shift the wet state of the fuel cell stack 1 to a wet side so as to increase moisture in the electrolyte membrane.

The wet operation includes an operation to decrease the compressor flow rate (to decrease the output of the compressor 22), an operation to increase the cathode gas pressure (to decrease the opening degree of the cathode pressure control valve 27), and an operation to increase the bypass valve opening degree (to increase the bypass flow rate).

Here, the operation to decrease the compressor flow rate also decreases the stack supply flow rate, so that wetting of the fuel cell stack 1 proceeds.

Further, in the operation to increase the cathode gas pressure, as the cathode gas pressure increases, an amount of water to be discharged from the fuel cell stack 1 decreases. Accordingly, moisture is further kept inside the fuel cell stack 1, so that wetting of the fuel cell stack 1 further proceeds.

Further, in the operation to increase the bypass valve opening degree, the stack supply flow rate decreases, so that wetting of the fuel cell stack 1 proceeds.

Further, the dry operation includes an operation to decrease the bypass valve opening degree (to decrease the bypass flow rate), an operation to decrease the cathode gas pressure (to increase the opening degree of the cathode pressure control valve 27), and an operation to increase the compressor flow rate (to improve the output of the compressor 22).

Here, in the operation to decrease the bypass valve opening degree, the stack supply flow rate increases, so that drying of the fuel cell stack 1 proceeds.

Further, in the operation to decrease the cathode gas pressure, as the cathode gas pressures decreases, an amount of water to be discharged from the fuel cell stack 1 increases. Accordingly, water is further discharged from the fuel cell stack 1, so that drying of the fuel cell stack 1 further proceeds.

Here, the compressor flow rate is determined according to a request load, a dilution request, and a minimum flow rate for surging prevention. However, from the viewpoint of the dilution request and surging prevention, in a case where the compressor flow rate exceeds a necessary stack supply flow rate according to the request load, it is conceivable that the bypass valve opening degree is increased so that an excessive amount of the cathode gas bypasses the fuel cell stack 1 via the bypass passage 28, thereby maintaining the stack supply flow rate appropriately.

However, in this case, for example, when the bypass valve opening degree is increased in a state where the cathode gas pressure is low and a pressure difference between the cathode gas supply passage 21 and the cathode gas discharge passage 26 is large, the stack supply flow rate may become lower than a request flow rate. Further, when the bypass valve opening degree is increased in a state where the compressor flow rate is excessive to a lower limit flow rate corresponding to the request load, the compressor output is controlled to an excessive state, so that power consumption increases.

In view of this, in the present embodiment, in a case where the wet state of the fuel cell is on the dry side from its target and the wet operation is performed by use of the bypass valve opening degree, the cathode gas pressure, and the cathode gas flow rate as the wet control parameters, the operation to decrease the compressor flow rate and the operation to increase the cathode gas pressure are performed in priority to the operation to increase the bypass valve opening degree.

This can prevent such a situation that, in the wet operation, the bypass valve opening degree is increased while the compressor flow rate is not decreased sufficiently, so that the cathode gas is supplied to the fuel cell stack 1 excessively. Further, it is possible to prevent such a situation that the bypass valve opening degree is increased in a state where the cathode gas pressure is not increased sufficiently so that the stack supply flow rate is decreased and an output voltage and a cell voltage are decreased.

Further, in a case where the wet state of the fuel cell is on the wet side from its target and the dry operation is performed, the operation to decrease the bypass valve opening degree is performed in priority to the operation to increase the compressor flow rate and the operation to decrease the cathode gas pressure.

Here, the "priority" in the present embodiment indicates that, at the time of the wet operation or the dry operation, a control amount of one wet control parameter among adjustment of the compressor flow rate, adjustment of the cathode gas pressure, and adjustment of the bypass valve opening degree is maximized (or made predominant) in priority to the adjustment of the other wet control parameters.

For example, in the present embodiment, in the wet operation, the compressor flow rate is adjusted to be as large as possible (a first priority), then, the opening degree of the cathode pressure control valve 27 is adjusted to be as large as possible (a second priority), and finally, the bypass valve opening degree is adjusted to decrease (a third priority).

The following describes a control structure for the wet operation and the dry operation in the present embodiment and its logic in detail.

Figure 2:
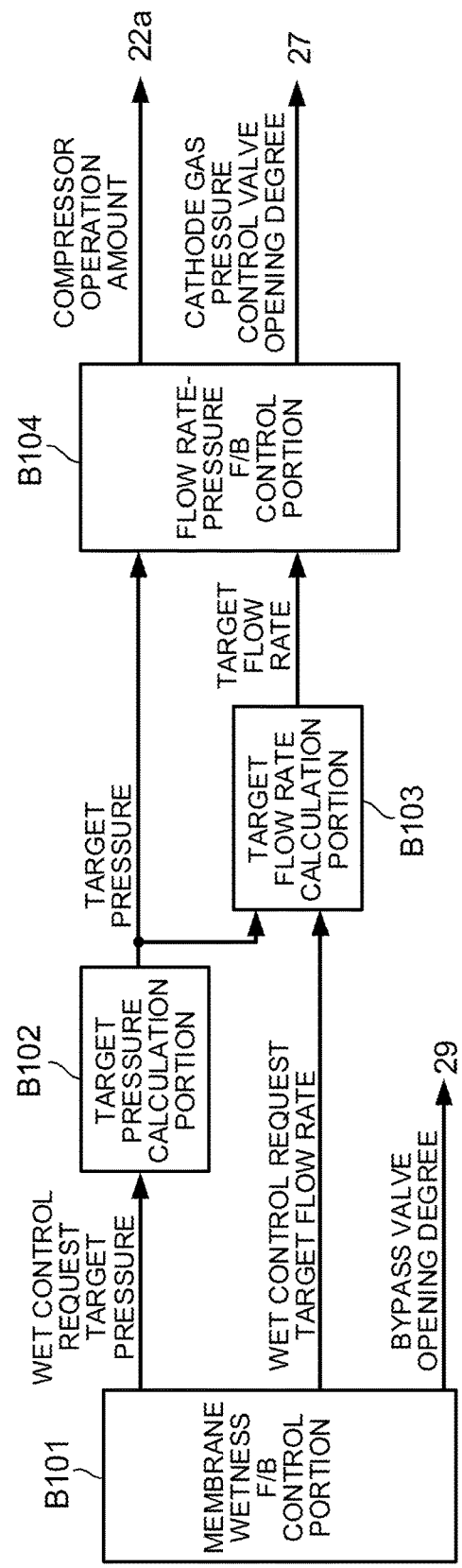
FIG. 2 is a block diagram to describe an overall function of a controller for a wet control.

FIG. 2 is a block diagram to describe an overall function of the controller 200 in terms of the wet control in the present embodiment.

As illustrated herein, the controller 200 includes a membrane wetness F/B control portion B101, a target pressure calculation portion B102, a target flow rate calculation portion B103, and a flow rate-pressure F/B control portion B104.

The membrane wetness F/B control portion B101 calculates a wet control request target pressure as a target value of the cathode gas pressure determined from the viewpoint of the wet state of the fuel cell, and a wet control request target flow rate as a target value of the compressor flow rate determined from the viewpoint of the wet state of the fuel cell. The membrane wetness F/B control portion B101 then outputs the wet control request target pressure and the wet control request target flow rate thus calculated to the target pressure calculation portion B102 and the target flow rate calculation portion B103, respectively.

The target pressure calculation portion B102 calculates a target pressure as a final target value of the cathode gas pressure based on the wet control request target pressure thus input therein, and outputs it to the target flow rate calculation portion B103 and the flow rate-pressure F/B control portion B104.

The target flow rate calculation portion B103 calculates a target flow rate as a final target value of the compressor flow rate based on the target pressure and the wet control request target flow rate thus input therein, and outputs it to the flow rate-pressure F/B control portion B104.

The flow rate-pressure F/B control portion B104 performs a feedback control on the compressor 22 and the cathode pressure control valve 27 based on the target pressure and the target flow rate thus input therein. The following more specifically describes a cathode control in the wet control according to the present embodiment with reference to FIGS. 3 to 12.

Figure 3:
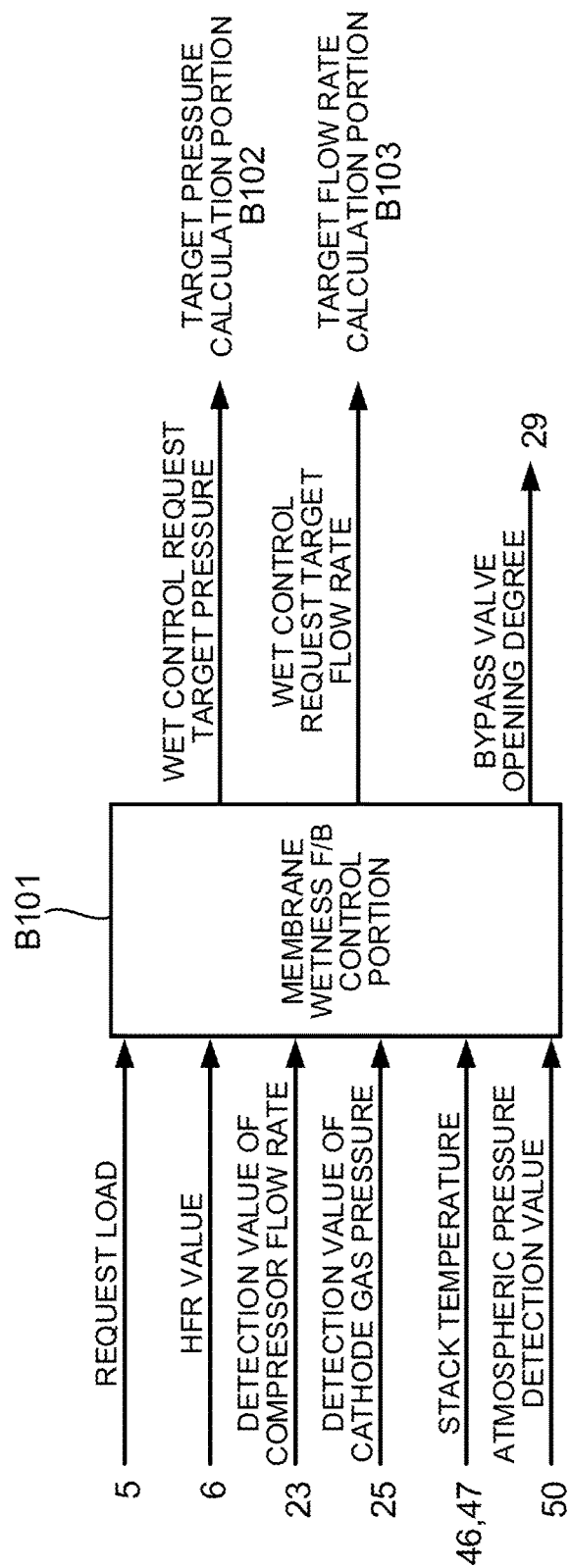
FIG. 3 is a view to describe details of a control by a membrane wetness F/B control portion.

FIG. 3 is a view to describe details of a control by the membrane wetness F/B control portion B101.

As illustrated herein, the request load from the loading device 5, the HFR value calculated in the impedance measuring device 6, a detection value of the compressor flow rate (hereinafter also referred to as a "compressor flow rate detection value") from the air flow meter 23, a detection value of the cathode gas pressure (hereinafter also referred to as a "cathode gas pressure detection value") from the cathode pressure sensor 25, the stack temperature based on the detection values of the inlet coolant temperature sensor 46 and the outlet coolant temperature sensor 47, and an atmospheric pressure detection value from the atmospheric pressure sensor 50 are input into the membrane wetness F/B control portion B101. The membrane wetness F/B control portion B101 calculates the wet control request target pressure and the wet control request target flow rate based on those values. Here, details of the calculation of the wet control request target pressure and the wet control request target flow rate by the membrane wetness F/B control portion B101 will be described.

Figure 4:
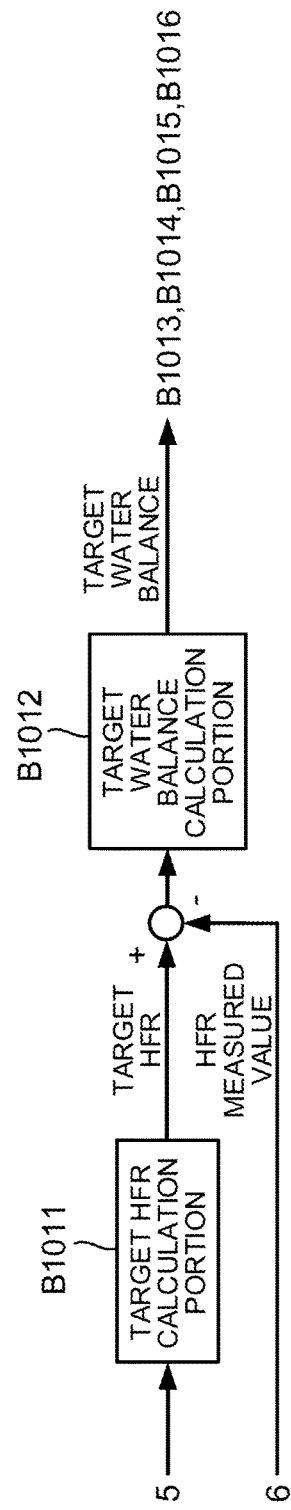
FIG. 4 is a view to describe a calculation mode of a target water balance.

FIG. 4 is a view to describe a calculation mode of a target water balance by the membrane wetness F/B control portion B101. Further, FIG. 5 is a view to describe a logic to set priorities of the wet control parameters in the wet operation by the membrane wetness F/B control portion B101.

Figure 5:
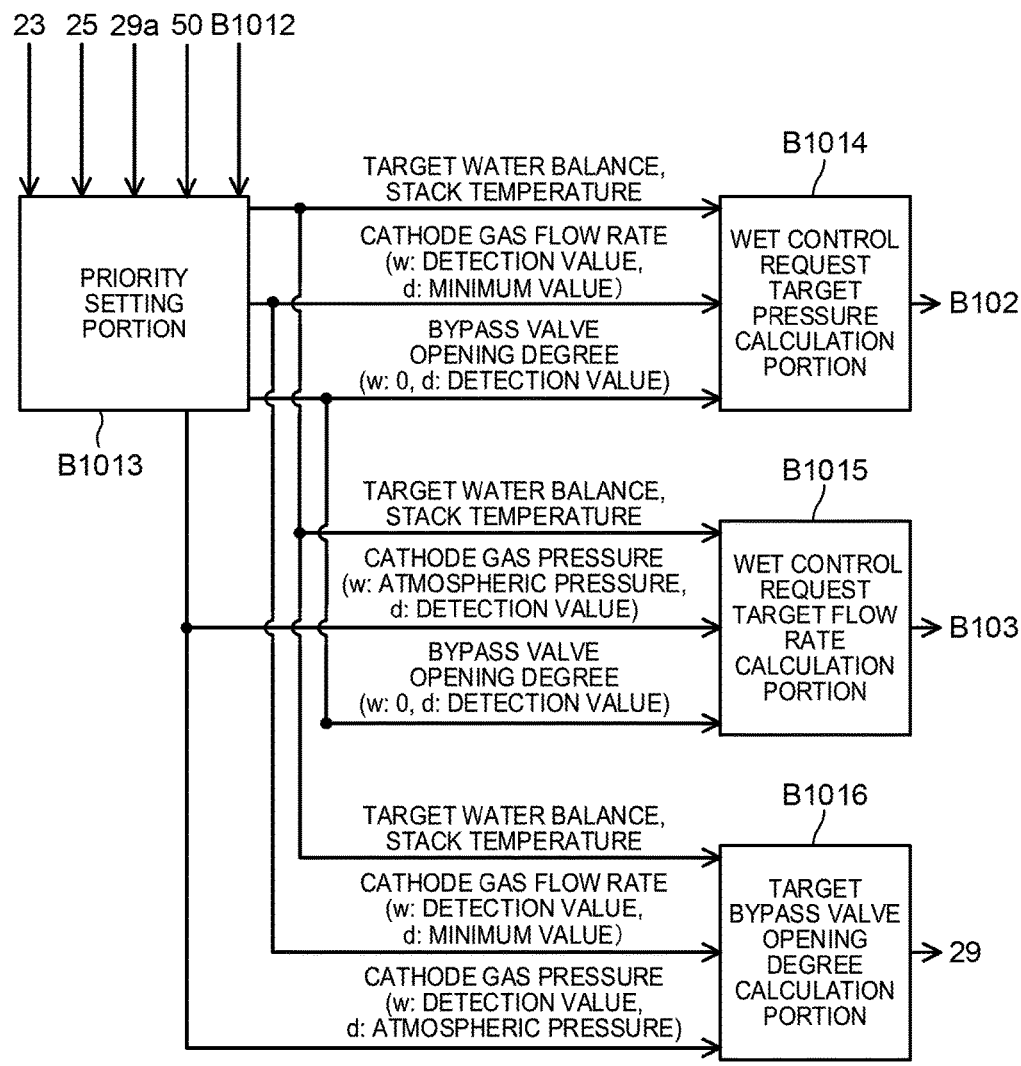
FIG. 5 is a view to describe a logic to set priorities of wet control parameters in a wet operation.

As illustrated in FIGS. 4 and 5, the membrane wetness F/B control portion B101 includes a target HFR calculation portion B1011, a target water balance calculation portion B1012, a priority setting portion B1013, a wet control request target pressure calculation portion B1014, a wet control request target flow rate calculation portion B1015, and a target bypass valve opening degree calculation portion B1016.

The request load is input into the target HFR calculation portion B1011. The target HFR calculation portion B1011 calculates a target HFR as a target value of the HFR value from a predetermined membrane wetness control map based on the request load.

Figure 6:
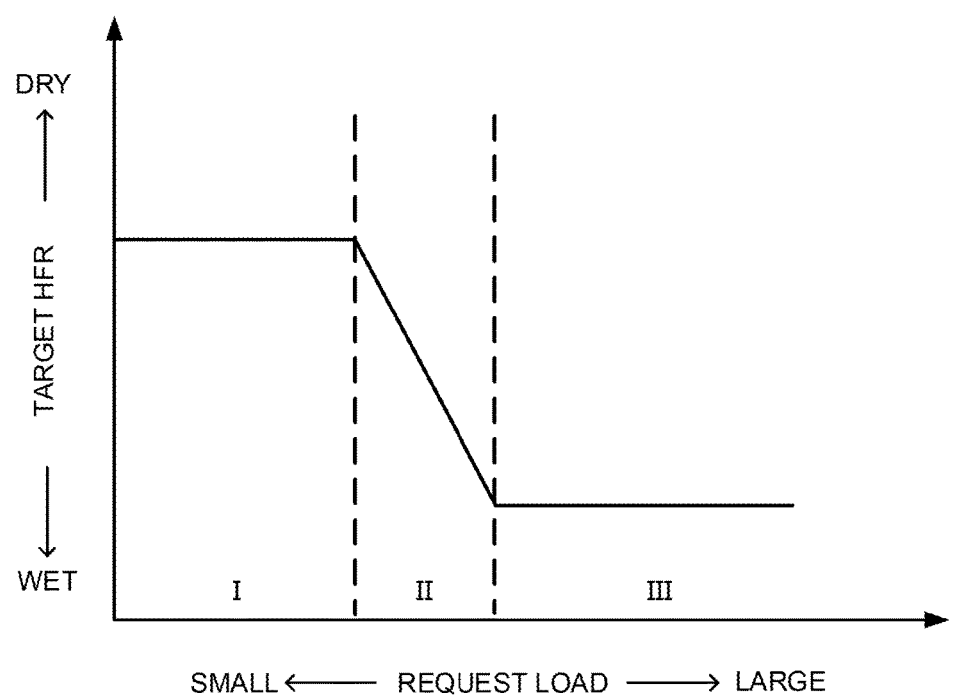
FIG. 6 is a view to describe a membrane wetness control map.

FIG. 6 is a view illustrating the membrane wetness control map. In the membrane wetness control map, in a region I where the request load is relatively small, a request power generation amount is small and an amount of liquid water in the fuel cell can be made small, so that the target HFR takes a predetermined constant value that is relatively large.

Further, in a region II where the request load takes an intermediate value, as the request load increases, the fuel cell is controlled further toward the wet side, so that a power generation state is maintained appropriately. Accordingly, in the region II, as the request load increases, the target HFR becomes smaller.

Further, in a region III where the request load is relatively large, the compressor flow rate is sufficiently large, so that influence of liquid water retained in the fuel cell stack 1 is small. On that account, the target HFR within a high request load is set to a constant value that is relatively smallest.

Referring back to FIG. 4, the target HFR calculation portion B1011 outputs the target HFR thus calculated.

A value (hereinafter the value is also referred to as an "HFR deviation") obtained by subtracting the HFR measured value from the target HFR is input into the target water balance calculation portion B1012. The target water balance calculation portion B1012 calculates a target water balance based on the HFR deviation.

Here, the target water balance indicates a balance between an amount of water produced along with power generation of the fuel cell stack 1 and an amount of water discharged outside the fuel cell system 100 from the fuel cell stack 1.

That is, the target water balance is a parameter indicative of excess or shortage of moisture from a target wet state in the fuel cell. More specifically, when a value obtained by subtracting an actual water balance as an actual water balance of the fuel cell stack 1 from the target water balance is a positive value, it means that the fuel cell is dry and the wet operation is requested. Meanwhile, when the value obtained by subtracting the actual water balance from the target water balance is a negative value, it means that moisture in the fuel cell is excessive and the dry operation is requested. Accordingly, from the viewpoint of maintaining the wet state of the fuel cell appropriately, it is aimed that the value obtained by subtracting the target water balance from the actual water balance is made zero.

In the present embodiment, the target water balance calculation portion B1012 calculates a target water balance $Q_{F\_net\_water}$ based on Expression (1) as follows:

[Math. 1]

$$Q_{F\_net\_water} = Q_{F\_H2O\_in} - \frac{C_{C\_H2O\_out}}{C_{C\_dry\_out}} \times Q_{C\_dry\_out} \quad (1)$$

wherein:

$Q_{F\_H2O\_in}$ indicates an amount of produced water by power generation of the fuel cell;

$C_{C\_H2O\_out}$ indicates a cathode-outlet steam concentration;

$C_{C\_dry\_out}$ indicates a cathode-outlet dry gas concentration; and $Q_{C\_dry\_out}$ indicates a cathode-outlet dry gas flow rate.

Here, the cathode-outlet steam concentration $C_{C\_H2O\_out}$ is a concentration of steam included in the cathode gas at a cathode outlet of the fuel cell stack 1, and is found, for example, based on Expression (2) as follows:

[Math. 2]

$$C_{C\_H2O\_out} = \frac{P_{CH2O\_out}}{P_{C\_out}} \quad (2)$$

wherein:

$P_{CH2O\_out}$ indicates a cathode-outlet steam partial pressure; and $P_{C\_out}$ indicates a cathode-outlet pressure.

Further, the cathode-outlet steam partial pressure $P_{CH2O\_out}$ is a partial pressure of the steam included in the cathode gas at the cathode outlet of the fuel cell stack 1, and is found, for example, based on Expression (3) as follows:

[Math. 3]

$$P_{CH2O\_out} = \text{EXP}\{16.57 - 3985/(-39.72 + Ts + 273.15)\} \quad (3)$$

wherein EXP indicates a natural logarithm.

Further, the cathode-outlet dry gas concentration $C_{C\_dry\_out}$ is a concentration of gas, except the steam, included in the cathode gas at the cathode outlet of the fuel cell stack 1, and is found, for example, based on Expression (4) as follows:

[Math. 4]

$$C_{C\_dry\_out} = 1 - C_{C\_H2O\_out} \quad (4)$$

Further, the cathode-outlet dry gas flow rate $Q_{C\_dry\_out}$ is a flow rate of the gas, except the steam, included in the cathode gas at the cathode outlet of the fuel cell stack 1, and is found, for example, based on Expression (5) as follows:

[Math. 5]

$$Q_{C\_dry\_out} = Q_{S\_in} - Q_{o\_exp} \quad (5)$$

wherein:

$Q_{S\_in}$ indicates a stack supply flow rate; and $Q_{o\_exp}$ indicates an oxygen consumption flow rate.

The stack supply flow rate $Q_{S\_in}$ is found such that the bypass flow rate as the flow rate of the cathode gas that bypasses the fuel cell stack 1 via the bypass passage 28 is subtracted from the compressor flow rate, as described above.

Further, in the present embodiment, the bypass flow rate can be calculated based on the bypass valve opening degree and the compressor flow rate according to a predetermined map.

Figure 7:
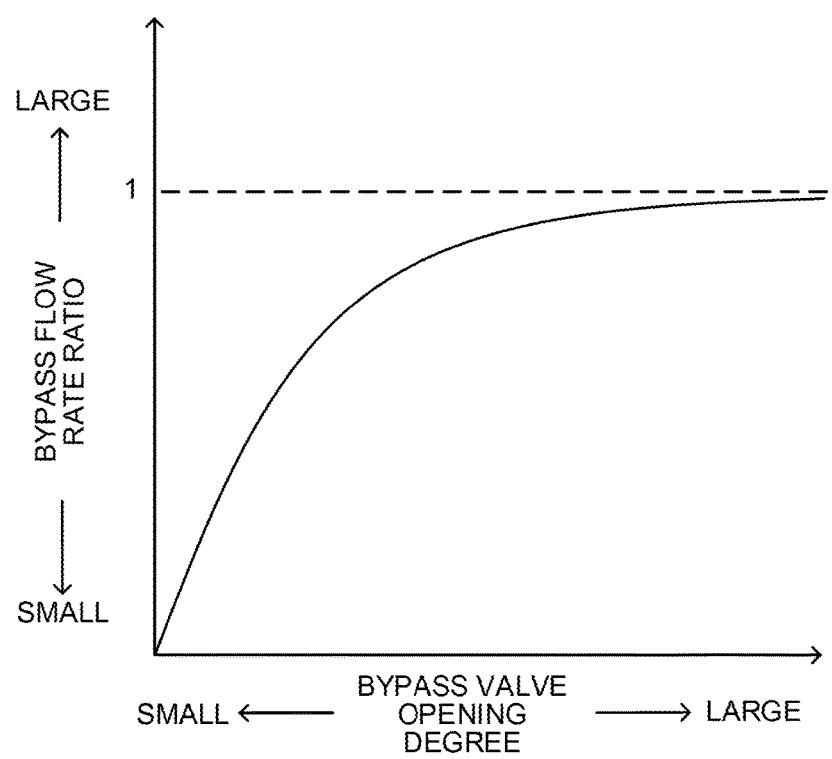
FIG. 7 is a map indicative of a relationship between a bypass valve opening degree and a bypass flow rate ratio.

FIG. 7 is a map illustrating a relationship between the bypass valve opening degree and a bypass flow rate ratio. Here, a bypass flow rate ratio λ indicates a ratio of a bypass flow rate in the compressor flow rate corresponding to the bypass valve opening degree. Accordingly, bypass flow rate=bypass flow rate ratio λ×compressor flow rate is satisfied. Note that, since the bypass flow rate ratio λ is determined based on the bypass valve opening degree by use of the bypass flow rate map illustrated in FIG. 7, the bypass flow rate can be found from the compressor flow rate.

The oxygen consumption flow rate $Q_{o\_exp}$ is a flow rate of oxygen in cathode gas consumed by electrochemical reaction in the fuel cell stack 1. The oxygen consumption flow rate $Q_{o\_exp}$ can be found by multiplying a request load by an oxygen consumption flow rate transformation coefficient determined in advance by experiment and the like, for example.

Now referring back to FIG. 4, the target water balance calculation portion B1012 outputs the target water balance $Q_{F\_net\_water}$ thus calculated to the priority setting portion B1013.

As illustrated in FIG. 5, the compressor flow rate detection value, the cathode gas pressure detection value, the bypass valve opening degree, the atmospheric pressure detection value, and the target water balance $Q_{F\_net\_water}$ calculated by the target water balance calculation portion B1012 are input into the priority setting portion B1013.

Based on the input values, the priority setting portion B1013 sets priorities to adjust the wet control parameters, i.e., the cathode gas pressure, the compressor flow rate, and the bypass valve opening degree used for the wet control.

The priority setting portion B1013, acquires an actual water balance $Q_{F\_net\_water\_R}$ from the HFR measured value based on a predetermined water balance map. Based on the target water balance $Q_{F\_net\_water}$ and the actual water balance $Q_{F\_net\_water\_R}$, the priority setting portion B1013 determines which one of the wet operation and the dry operation should be performed.

More specifically, when target water balance $Q_{F\_net\_water}$–actual water balance $Q_{F\_net\_water\_R}>0$ is satisfied, the priority setting portion B1013 determines that the wet operation should be performed, and when target water balance $Q_{F\_net\_water}$–actual water balance $Q_{F\_net\_water\_R}\leq 0$ is satisfied, the priority setting portion B1013 determines that the dry operation should be performed. In the following description, "target water balance $Q_{F\_net\_water}$–actual water balance $Q_{F\_net\_water\_R}$" is also referred to as a water balance deviation $\Delta Q$.

Further, the priority setting portion B1013 outputs the water balance deviation $\Delta Q$, the stack temperature, the compressor flow rate, and the bypass valve opening degree as wet state control parameters to the wet control request target pressure calculation portion B1014. Further, the priority setting portion B1013 outputs the water balance deviation $\Delta Q$, the stack temperature, the cathode gas pressure, and the bypass valve opening degree as wet state control parameters to the wet control request target flow rate calculation portion B1015. Moreover, the priority setting portion B1013 outputs the water balance deviation $\Delta Q$, the stack temperature, the compressor flow rate, and the cathode gas pressure as wet state control parameters to the target bypass valve opening degree calculation portion B1016.

Particularly, in the present embodiment, the priority setting portion B1013 determines appropriately the compressor flow rate and the bypass valve opening degree to be output to the wet control request target pressure calculation portion B1014, the cathode gas pressure and the bypass valve opening degree to be output to the wet control request target flow rate calculation portion B1015, and the compressor flow rate and the cathode gas pressure to be output to the target bypass valve opening degree calculation portion B1016, according to the result of the determination on which one of the wet operation and the dry operation should be performed, the determination being made based on whether the water balance deviation $\Delta Q$ is positive or negative.

First, when it is determined that the wet operation should be performed, the priority setting portion B1013 outputs the target water balance, the stack temperature, the compressor flow rate detection value as the compressor flow rate, and a value of 0 (fully closed) as the bypass valve opening degree to the wet control request target pressure calculation portion B1014.

Further, the priority setting portion B1013 outputs the target water balance, the stack temperature, the cathode gas pressure detection value as the cathode gas pressure, and the value of 0 as the bypass valve opening degree to the wet control request target flow rate calculation portion B1015.

Furthermore, the priority setting portion B1013 outputs the target water balance, the stack temperature, the compressor flow rate detection value as the compressor flow rate, and the cathode gas pressure detection value as the cathode gas pressure to the target bypass valve opening degree calculation portion B1016.

In the meantime, when it is determined that the dry operation should be performed, the priority setting portion B1013 outputs the water balance deviation, the stack temperature, a flow rate minimum value as the compressor flow rate, and a bypass valve opening degree detection value as the bypass valve opening degree to the wet control request target pressure calculation portion B1014.

Further, the priority setting portion B1013 outputs the target water balance, the stack temperature, the atmospheric pressure detection value as the cathode gas pressure, and the bypass valve opening degree detection value as the bypass valve opening degree to the wet control request target flow rate calculation portion B1015.

Furthermore, the priority setting portion B1013 outputs the target water balance, the stack temperature, the flow rate minimum value as the compressor flow rate, and the atmospheric pressure detection value as the cathode gas pressure to the target bypass valve opening degree calculation portion B1016.

Subsequently, the wet control request target pressure calculation portion B1014 calculates the wet control request target pressure based on the water balance deviation $\Delta Q$, the stack temperature, the compressor flow rate, and the bypass valve opening degree thus input therein from the priority setting portion B1013.

More specifically, the wet control request target pressure calculation portion B1014 performs the calculation so that the wet control request target pressure becomes higher (or lower) as the input target water balance becomes larger (or smaller). Further, the wet control request target pressure calculation portion B1014 performs the calculation so that the wet control request target pressure becomes higher (or lower) as the input stack temperature becomes higher (or lower). Furthermore, the wet control request target pressure calculation portion B1014 performs the calculation so that the wet control request target pressure becomes higher (or lower) as the input compressor flow rate becomes higher (or lower). Furthermore, the wet control request target pressure calculation portion B1014 performs the calculation so that the wet control request target pressure becomes lower (or higher) as the input bypass valve opening degree becomes higher (or lower).

The wet control request target flow rate calculation portion B1015 calculates the wet control request target flow rate based on the target water balance, the stack temperature, the cathode gas pressure, and the bypass valve opening degree input therein from the priority setting portion B1013.

More specifically, the wet control request target flow rate calculation portion B1015 performs the calculation so that the wet control request target flow rate becomes higher (or lower) as the input target water balance becomes larger (or smaller). Further, the wet control request target flow rate calculation portion B1015 performs the calculation so that the wet control request target flow rate becomes lower (or higher) as the stack temperature becomes higher (or lower). Further, the wet control request target flow rate calculation portion B1015 performs the calculation so that the wet control request target flow rate becomes higher (or lower) as the input cathode gas pressure becomes higher (or lower). Furthermore, the wet control request target flow rate calculation portion B1015 performs the calculation so that the wet control request target flow rate becomes higher (or lower) as the input bypass valve opening degree becomes higher (or lower).

The target bypass valve opening degree calculation portion B1016 calculates the target bypass valve opening degree based on the target water balance, the stack temperature, the compressor flow rate, and the cathode gas pressure input from the priority setting portion B1013.

More specifically, the target bypass valve opening degree calculation portion B1016 performs the calculation so that the target bypass valve opening degree becomes higher (or lower) as the input target water balance becomes larger (or smaller). The target bypass valve opening degree calculation portion B1016 performs the calculation so that the target bypass valve opening degree becomes higher (or lower) as the input stack temperature becomes higher (or lower). Further, the target bypass valve opening degree calculation portion B1016 performs the calculation so that the target bypass valve opening degree becomes higher (or lower) as the input compressor flow rate becomes higher (or lower). Furthermore, the target bypass valve opening degree calculation portion B1016 performs the calculation so that the target bypass valve opening degree becomes lower (or higher) as the input cathode gas pressure becomes higher (or lower).

Next will be described calculation of each target value in the wet operation.

In the wet operation, as has been described earlier, the target water balance, the stack temperature, the atmospheric pressure detection value as the cathode gas pressure, and the value of 0 as the bypass valve opening degree are input into the wet control request target flow rate calculation portion B1015 from the priority setting portion B1013.

Here, the atmospheric pressure detection value is a minimum value assumed as the cathode gas pressure, and that the bypass valve opening degree is zero indicates that the bypass valve 29 is fully closed. Accordingly, in the wet operation, the wet control request target flow rate calculation portion B1015 calculates the wet control request target flow rate on the premise that the cathode gas pressure is lowest and the bypass valve opening degree is lowest. That is, in order to control the fuel cell toward the wet side, the wet control request target flow rate is calculated as a value as small as possible.

Further, in the wet operation, the target water balance, the stack temperature, a detection value of the compressor flow rate, and the value of 0 as the bypass valve opening degree are input into the wet control request target pressure calculation portion B1014.

Here, in the wet operation, the wet control request target pressure calculation portion B1014 calculates the wet control request target pressure such that the bypass valve opening degree is zero that is smallest and the detection value adjusted to a lower side (toward the wet side of the fuel cell stack 1) by the wet control request target flow rate is used as the compressor flow rate. That is, in the wet operation, the wet control request target pressure is calculated on the premise that the bypass valve opening degree is lowest and the compressor flow rate is decreased so that the wet state is adjusted.

Further, in the wet operation, the target water balance, the stack temperature, the detection value of the compressor flow rate, and a detection value of the cathode gas pressure are input into the target bypass valve opening degree calculation portion B1016.

Accordingly, the target bypass valve opening degree calculation portion B1016 calculates the target bypass valve opening degree based on the detection value adjusted to the lower side (toward the wet side of the fuel cell stack 1) by the wet control request target flow rate, as the compressor flow rate, and the detection value adjusted to a higher side (toward the wet side of the fuel cell stack 1) by the wet control request target pressure, as the cathode gas pressure. That is, the target bypass valve opening degree is calculated so that an increasing amount of the bypass valve opening degree is set to a minimum, on the premise that the fuel cell is controlled to the wet side by decreasing the compressor flow rate and increasing the cathode gas pressure.

As described above, in the calculation mode of the target values of the wet control parameters by the wet control request target pressure calculation portion B1014, the wet control request target flow rate calculation portion B1015, and the target bypass valve opening degree calculation portion B1016 in the wet operation, the wet control request target flow rate is calculated so that the operation to decrease the compressor flow rate most contributes to the control on the fuel cell to the wet side at the time when the wet operation is performed.

Then, the wet control request target pressure is calculated so that the operation to increase the cathode gas pressure contributes to the control on the fuel cell toward the wet side. Finally, the target bypass valve opening degree is calculated so that a contribution of the operation to increase the bypass valve opening degree to the control on the fuel cell toward the wet side is smallest.

Next will be described the dry operation.

In the dry operation, the target water balance, the stack temperature, the flow rate minimum value as the compressor flow rate, and the atmospheric pressure detection value as the cathode gas pressure are input into the target bypass valve opening degree calculation portion B1016.

Here, the flow rate minimum value is a compressor flow rate when the wet state of the fuel cell stack 1 is maximized. Note that, when the flow rate minimum value is too low, poor power generation might occur due to an insufficient supply amount of the cathode gas to the fuel cell stack 1. On the other hand, when the flow rate minimum value is too high, noise due to surging and the like might easily occur. Accordingly, in consideration of those points comprehensively, a lowest value within a range where the performance of the fuel cell stack 1 can be secured is employed as the flow rate minimum value. The flow rate minimum value is set in advance by experiment according to an operating state of the fuel cell.

Accordingly, in order to control the fuel cell toward the dry side, the target bypass valve opening degree calculation portion B1016 calculates the target bypass valve opening degree on the premise that the compressor flow rate is the flow rate minimum value and the cathode gas pressure is the atmospheric pressure detection value. That is, the target bypass valve opening degree calculation portion B1016 calculates the target bypass valve opening degree so that the bypass valve opening degree is set as small as possible.

Further, in the dry operation, the target water balance, the stack temperature, the flow rate minimum value as the compressor flow rate, and a detection value as the bypass valve opening degree are input into the wet control request target pressure calculation portion B1014.

Hereby, the wet control request target pressure calculation portion B1014 calculates the wet control request target pressure based on the flow rate minimum value that has the smallest contribution to the control on the fuel cell stack 1 toward the dry side, as the compressor flow rate, and the detection value adjusted to a lower side (toward the dry side of the fuel cell stack 1) by the target bypass valve opening degree, as the bypass valve opening degree.

Further, in the dry operation, the target water balance, the stack temperature, the detection value of the bypass valve opening degree, and a detection value of the cathode gas pressure are input into the wet control request target flow rate calculation portion B1015. Accordingly, the wet control request target flow rate calculation portion B1015 calculates the wet control request target flow rate based on the detection value adjusted to the lower side (toward the dry side of the fuel cell stack 1) by the target bypass valve opening degree, as the bypass valve opening degree, and the detection value adjusted to a lower side (toward the dry side of the fuel cell stack 1) by the wet control request target pressure, as the cathode gas pressure.

As described above, in the calculation mode of the target values by the wet control request target pressure calculation portion B1014, the wet control request target flow rate calculation portion B1015, and the target bypass valve opening degree calculation portion B1016 in the dry operation, the dry operation by adjustment of the bypass valve opening degree is performed with top priority. Particularly, the dry operation is performed in the priority order from decreasing of the bypass valve opening degree, decreasing of the cathode gas pressure, and increasing of the compressor flow rate.

As illustrated in FIG. 5, in either of the wet operation and the dry operation, the wet control request target pressure calculation portion B1014, the wet control request target flow rate calculation portion B1015, and the target bypass valve opening degree calculation portion B1016 output the calculated wet control request target pressure and the calculated wet control request target flow rate to the target pressure calculation portion B102 and the target flow rate calculation portion B103, respectively.

Further, in the present embodiment, as illustrated in FIGS. 2 and 3, the membrane wetness F/B control portion B101 performs a feedback control on the bypass valve 29 based on the target bypass valve opening degree calculated by the target bypass valve opening degree calculation portion B1016, so that the opening degree of the bypass valve 29 approaches the target bypass valve opening degree (see FIG. 2). That is, the bypass valve 29 is opened and closed appropriately by the membrane wetness F/B control portion B101 according to the wet operation or the dry operation performed based on the wet state of the fuel cell.

Figure 8:
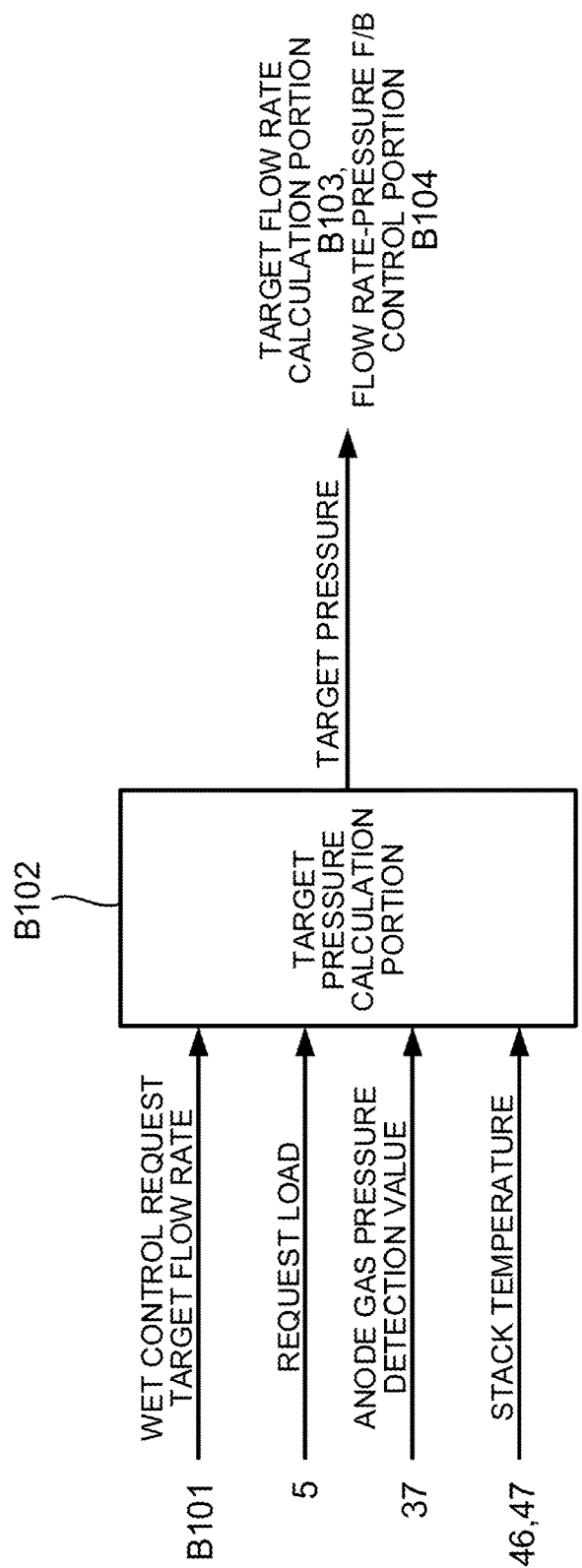
FIG. 8 is a view to describe a function of a target pressure calculation portion.

FIG. 8 is a view to describe a function of the target pressure calculation portion B102 illustrated in FIG. 2. As illustrated herein, the wet control request target pressure calculated by the membrane wetness F/B control portion B101, the request load, a detection value of the anode gas pressure from the anode pressure sensor 37, and the stack temperature are input into the target pressure calculation portion B102. The target pressure calculation portion B102 calculates a target pressure as a final target value of the cathode gas pressure based on these parameters.

Figure 9:
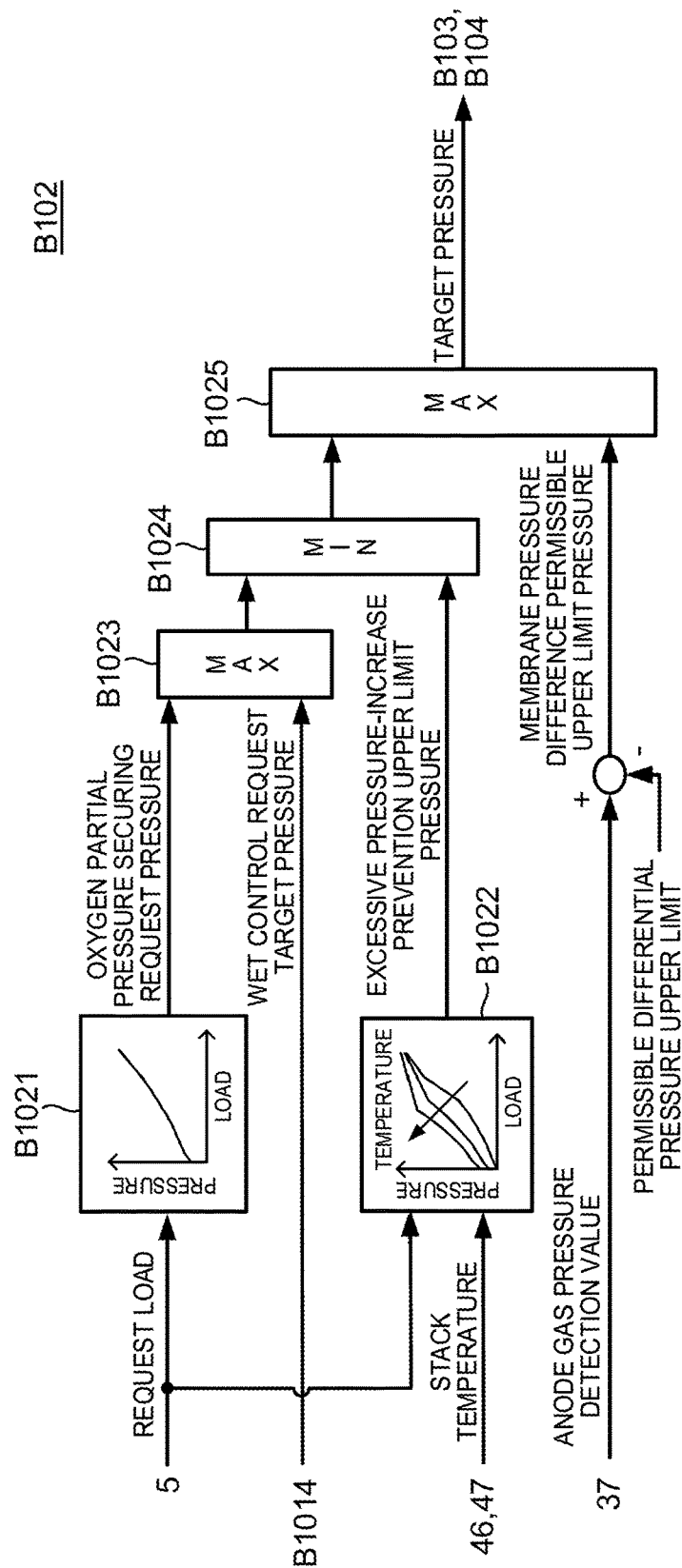
FIG. 9 is a block diagram to describe a calculation mode of a target pressure.

FIG. 9 is a block diagram to describe a calculation mode of the target pressure in the target pressure calculation portion B102.

As illustrated herein, the target pressure calculation portion B102 includes an oxygen partial pressure securing request air pressure calculation portion B1021, an excessive pressure-increase prevention upper limit pressure calculation portion B1022, a max select portion B1023, a minimum select portion B1024, and a max select portion B1025.

The request load is input into the oxygen partial pressure securing request air pressure calculation portion B1021. The oxygen partial pressure securing request air pressure calculation portion B1021 calculates an oxygen partial pressure securing request air pressure based on the request load from a predetermined oxygen partial pressure securing request air pressure map.

Here, the oxygen partial pressure securing request air pressure is a minimum value of the cathode gas pressure that is determined to satisfy a request of an oxygen concentration in the fuel cell stack 1, the request of the oxygen concentration being determined to secure a power generation capacity of the fuel cell stack 1 according to the request load.

Accordingly, in the oxygen partial pressure securing request air pressure map, as the request load becomes larger and an oxygen amount to be consumed by electrochemical reaction in the fuel cell stack 1 increases, the value of the oxygen partial pressure securing request air pressure to be found becomes higher.

The oxygen partial pressure securing request air pressure calculation portion B1021 outputs the oxygen partial pressure securing request air pressure thus calculated to the max select portion B1023.

The request load and the stack temperature are input into the excessive pressure-increase prevention upper limit pressure calculation portion B1022. The excessive pressure-increase prevention upper limit pressure calculation portion B1022 calculates an excessive pressure-increase prevention upper limit pressure from a predetermined excessive pressure-increase prevention upper limit pressure map based on the request load and the stack temperature.

Here, the excessive pressure-increase prevention upper limit pressure is an upper limit of the cathode gas pressure that is determined from the viewpoint of preventing the cathode gas pressure from keeping increasing in the wet operation or the dry operation.

In the excessive pressure-increase prevention upper limit pressure map, as the request load becomes larger, the excessive pressure-increase prevention upper limit pressure to be found becomes higher. Further, in the excessive pressure-increase prevention upper limit pressure map, as the stack temperature becomes higher, the excessive pressure-increase prevention upper limit pressure to be found becomes higher.

In such a tendency of the excessive pressure-increase prevention upper limit pressure map, the excessive pressure-increase prevention upper limit pressure is set to be relatively high at a high load state or a high temperature, while the excessive pressure-increase prevention upper limit pressure is set to be relatively low at a low load state or a low temperature.

Note that the excessive pressure-increase prevention upper limit pressure calculation portion B1022 may determine the excessive pressure-increase prevention upper limit pressure in consideration of the wet state of the fuel cell stack 1 such as the target HFR calculated by the target HFR calculation portion B1011 and the target water balance, instead of or in addition to the request load and the stack temperature. Particularly, the excessive pressure-increase prevention upper limit pressure may be increased as the fuel cell stack 1 shifts to the dry side.

Particularly, in a case where the excessive pressure-increase prevention upper limit pressure is set to be relatively low in the low load state, at the low temperature, and at the time when the fuel cell stack 1 is dry, even if the bypass valve 29 is closed, the cathode gas pressure is restrained from increasing excessively, thereby making it possible to decrease power consumption of the compressor 22 and to contribute to improvement of fuel efficiency and restraint of noise.

Subsequently, the oxygen partial pressure securing request air pressure calculated by the oxygen partial pressure securing request air pressure calculation portion B1021 and the wet control request target pressure calculated by the wet control request target pressure calculation portion B1014 are input into the max select portion B1023. The max select portion B1023 outputs a larger one of the oxygen partial pressure securing request air pressure and the wet control request target pressure thus input therein to the minimum select portion B1024.

Hereby, a value output from the minimum select portion B1024 is determined in consideration of both securing of the oxygen concentration corresponding to the request of the power generation amount in the fuel cell stack 1 and securing of the cathode gas pressure requested in the wet control of the fuel cell stack 1.

A pressure value output from the max select portion B1023 and the excessive pressure-increase prevention upper limit pressure calculated by the excessive pressure-increase prevention upper limit pressure calculation portion B1022 are input into the minimum select portion B1024. The minimum select portion B1024 outputs a smaller one of the pressure value and the excessive pressure-increase prevention upper limit pressure thus input therein to the max select portion B1025.

Thus, a value output from the minimum select portion B1024 is determined in consideration of setting a limit so as not to exceed the excessive pressure-increase prevention upper limit pressure while the oxygen concentration in the fuel cell stack 1 is secured and a value requested in the wet control is satisfied.

Further, the pressure value input from the minimum select portion B1024 and a membrane pressure difference permissible upper limit obtained by subtracting a permissible differential pressure upper limit from the detection value of the anode gas pressure are input into the max select portion B1025.

Here, the permissible differential pressure upper limit is an upper limit pressure permitted as a differential pressure between the anode gas pressure and the cathode gas pressure in the fuel cell stack 1 from the viewpoint of protecting the electrolyte membrane of the fuel cell. Accordingly, by subtracting the permissible differential pressure upper limit from the detection value of the anode gas pressure, a membrane pressure difference permissible upper limit pressure as an upper limit of the cathode gas pressure permitted from the viewpoint of protecting the electrolyte membrane of the fuel cell can be obtained.

Then, the max select portion B1025 outputs, as the target pressure, a larger one of the pressure value input from the minimum select portion B1024 and the membrane pressure difference permissible upper limit pressure to the target flow rate calculation portion B103 and the flow rate-pressure F/B control portion B104.

Hereby, the target pressure as the final target value of the cathode gas pressure is set so as to restrict an excessive increase of a membrane pressure difference, secure the oxygen concentration in the fuel cell stack 1, and satisfy the request in the wet control, and not to exceed the excessive pressure-increase prevention upper limit pressure.

Figure 10:
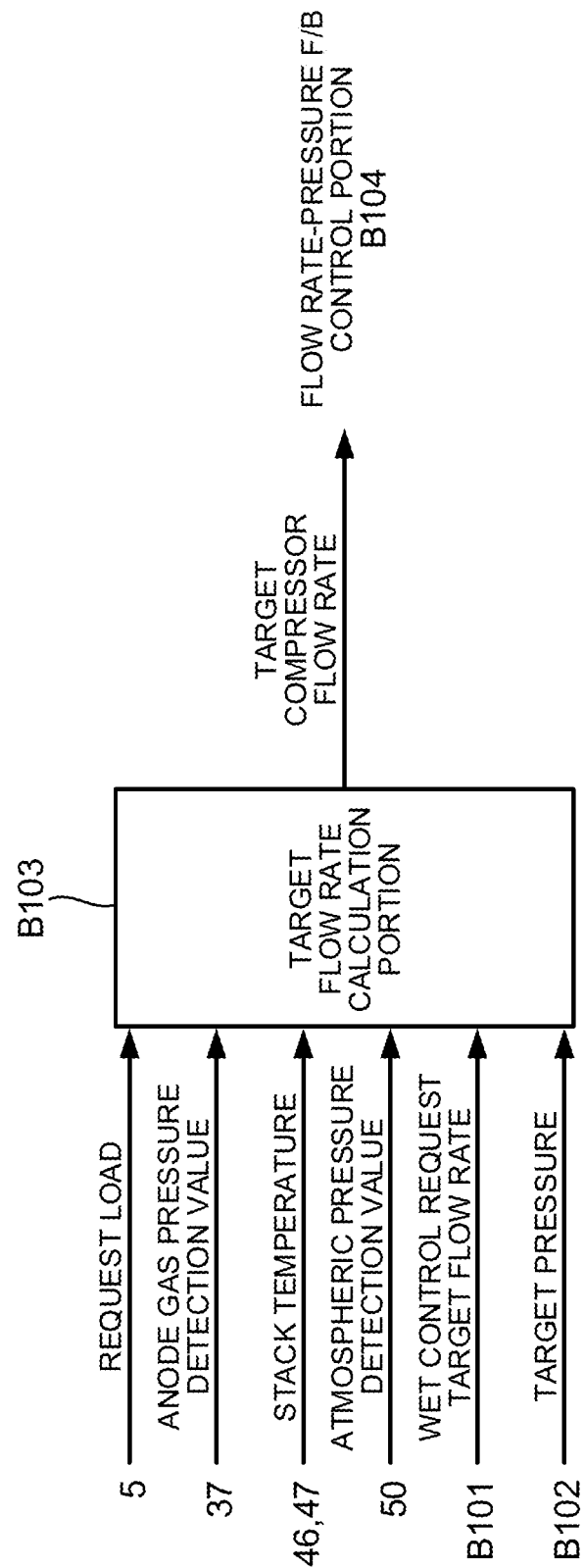
FIG. 10 is a view to describe a function of a target flow rate calculation portion.

FIG. 10 is a view to describe a function of the target flow rate calculation portion B103. As illustrated herein, the request load, the detection value of the anode gas pressure, the stack temperature, the atmospheric pressure detection value, the wet control request target flow rate, and the target pressure are input into the target flow rate calculation portion B103. The target flow rate calculation portion B103 calculates the target flow rate as the final target value of the compressor flow rate based on these input values.

Figure 11:
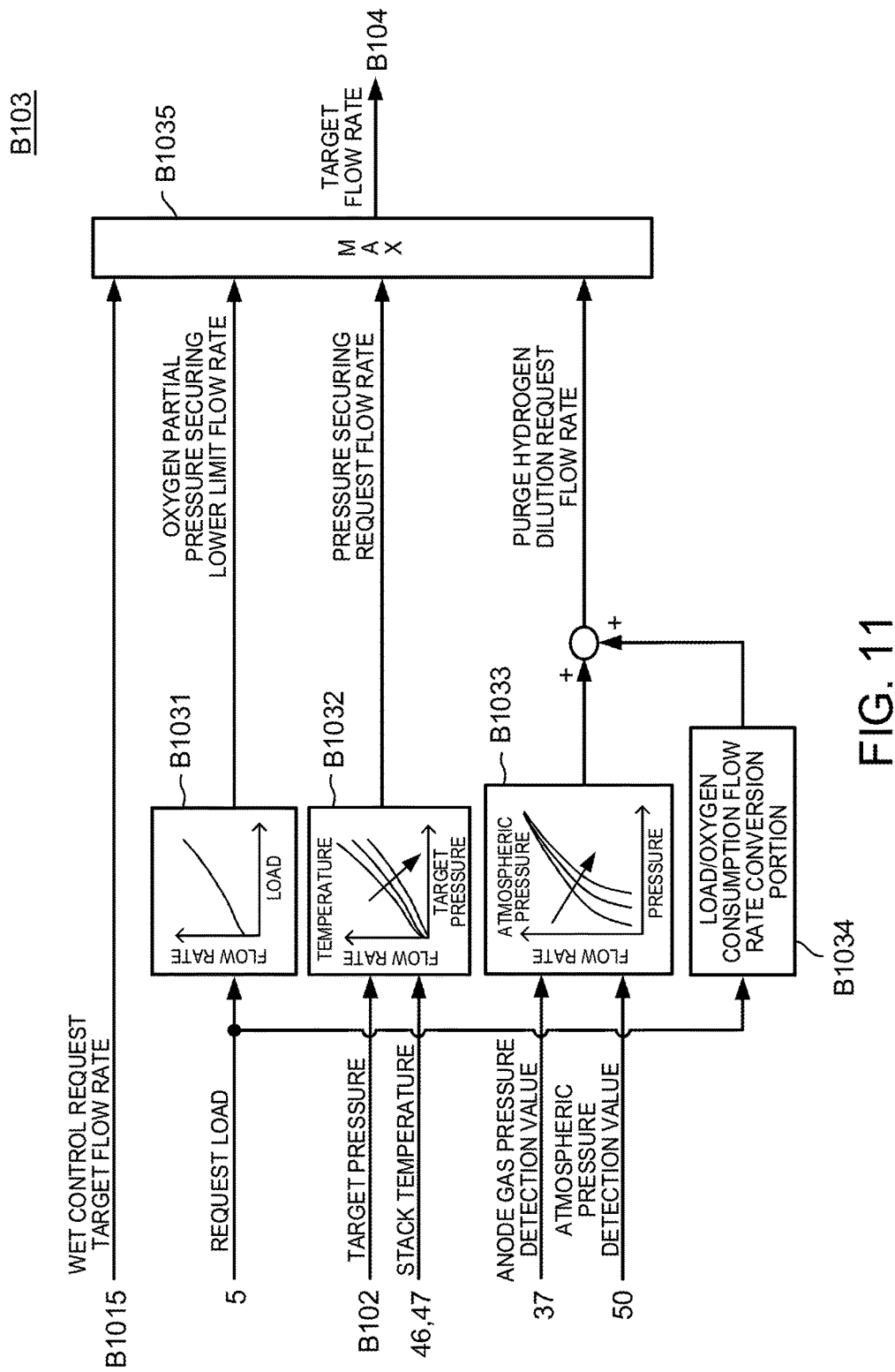
FIG. 11 is a block diagram to describe a calculation mode of a target flow rate.

FIG. 11 is a block diagram to describe a calculation mode of the target flow rate in the target flow rate calculation portion B103.

As illustrated herein, the target flow rate calculation portion B103 includes an oxygen partial pressure securing lower limit flow rate calculation portion B1031, a pressure securing request flow rate calculation portion B1032, a purge hydrogen dilution request flow rate calculation portion B1033, a load/oxygen consumption flow rate conversion portion B1034, and a max select portion B1035.

The request load is input into the oxygen partial pressure securing lower limit flow rate calculation portion B1031. The oxygen partial pressure securing lower limit flow rate calculation portion B1031 calculates an oxygen partial pressure securing lower limit flow rate based on the request load from a predetermined oxygen partial pressure securing lower limit flow rate map. The oxygen partial pressure securing lower limit flow rate is a lower limit of the compressor flow rate which is determined from the viewpoint of satisfying a request of the oxygen concentration in the fuel cell stack 1 and which is obtained in advance by experiment and the like.

Accordingly, in the oxygen partial pressure securing lower limit flow rate map, as the request load becomes larger and the oxygen amount to be consumed by electrochemical reaction in the fuel cell stack 1 increases, a value of the oxygen partial pressure securing lower limit flow rate to be found becomes higher.

Note that the lower limit of the compressor flow rate may be determined from the viewpoint of preventing flooding and local water clogging in the fuel cell stack 1. Particularly, it is preferable that the lower limit be set to a value which secures the oxygen concentration in the fuel cell stack 1 and which can prevent flooding and local water clogging.

Then, the oxygen partial pressure securing lower limit flow rate calculation portion B1031 outputs a calculated oxygen partial pressure securing request air flow rate to the max select portion B1035.

The target pressure from the target pressure calculation portion B102 and the stack temperature are input into the pressure securing request flow rate calculation portion B1032. The pressure securing request flow rate calculation portion B1032 calculates a pressure securing request flow rate based on the target pressure and the stack temperature from a predetermined pressure securing request flow rate map. Herein, the pressure securing request flow rate is a minimum value of the compressor flow rate that is requested to secure the target pressure from the viewpoint of surging prevention, according to the stack temperature.

In the pressure securing request flow rate map, as the target pressure becomes higher, the pressure securing request flow rate to be found becomes higher. Further, in the pressure securing request flow rate map, as the stack temperature becomes higher, the pressure securing request flow rate to be found is corrected to become lower.

Then, the pressure securing request flow rate calculation portion B1032 outputs the pressure securing request flow rate thus calculated to the max select portion B1035.

The detection value of the anode gas pressure and the atmospheric pressure detection value are input into the purge hydrogen dilution request flow rate calculation portion B1033. The purge hydrogen dilution request flow rate calculation portion B1033 calculates a purge hydrogen dilution request flow rate based on these input parameters from a predetermined purge hydrogen dilution request flow rate map. The purge hydrogen dilution request flow rate is a compressor flow rate requested to dilute the anode exhaust gas discharged from the fuel cell stack 1.

In the purge hydrogen dilution request flow rate map, as the detection value of the anode gas pressure becomes larger, the purge hydrogen dilution request flow rate to be found becomes larger. This is because a compressor flow rate necessary for dilution becomes larger as the anode gas pressure becomes higher. Further, in the purge hydrogen dilution request flow rate map, as the atmospheric pressure detection value becomes larger, the purge hydrogen dilution request flow rate to be found is corrected to become smaller. The reason is as follows. That is, as the atmospheric pressure becomes larger, the pressure difference between the cathode gas supply passage 21 and the cathode gas discharge passage 26 becomes large, so that the bypass flow rate increases, thereby making it possible to decrease the purge hydrogen dilution request flow rate as the compressor flow rate.

The request load is input into the load/oxygen consumption flow rate conversion portion B1034. The load/oxygen consumption flow rate conversion portion B1034 calculates an oxygen consumption flow rate in the fuel cell stack 1 by multiplying the request load input therein by a load/oxygen consumption flow rate transformation coefficient determined in advance by experiment and the like. Note that the load/oxygen consumption flow rate conversion portion B1034 may calculate the oxygen consumption flow rate based on a predetermined map defining a relationship between the request load and the oxygen consumption flow rate in the fuel cell stack 1.

Further, in the present embodiment, the oxygen consumption flow rate as a correction value is added to the purge hydrogen dilution request flow rate calculated by the purge hydrogen dilution request flow rate calculation portion B1033, and a resultant value is output to the max select portion B1035. When such correction is performed by adding, to the purge hydrogen dilution request flow rate, the oxygen consumption flow rate indicative of an oxygen flow rate to be consumed by electrochemical reaction in the fuel cell stack 1, the accuracy of the purge hydrogen dilution request flow rate improves more.

The wet control request target flow rate from the wet control request target flow rate calculation portion B1015, the oxygen partial pressure securing request air flow rate from the oxygen partial pressure securing lower limit flow rate calculation portion B1031, the pressure securing request flow rate from the pressure securing request flow rate calculation portion B1032, and the corrected purge hydrogen dilution request flow rate are input into the max select portion B1035.

The max select portion B1035 outputs a maximum value among the wet control request target flow rate, the oxygen partial pressure securing request air flow rate, the pressure securing request flow rate, and the purge hydrogen dilution request flow rate to the flow rate-pressure F/B control portion B104 as a target flow rate.

Hereby, a final target flow rate is a value that satisfies all of securing of an oxygen partial pressure corresponding to the request load in the fuel cell stack 1, a request in the wet control of the fuel cell stack 1, securing of a pressure of the cathode gas to the fuel cell stack 1, and a dilution request.

Figure 12:
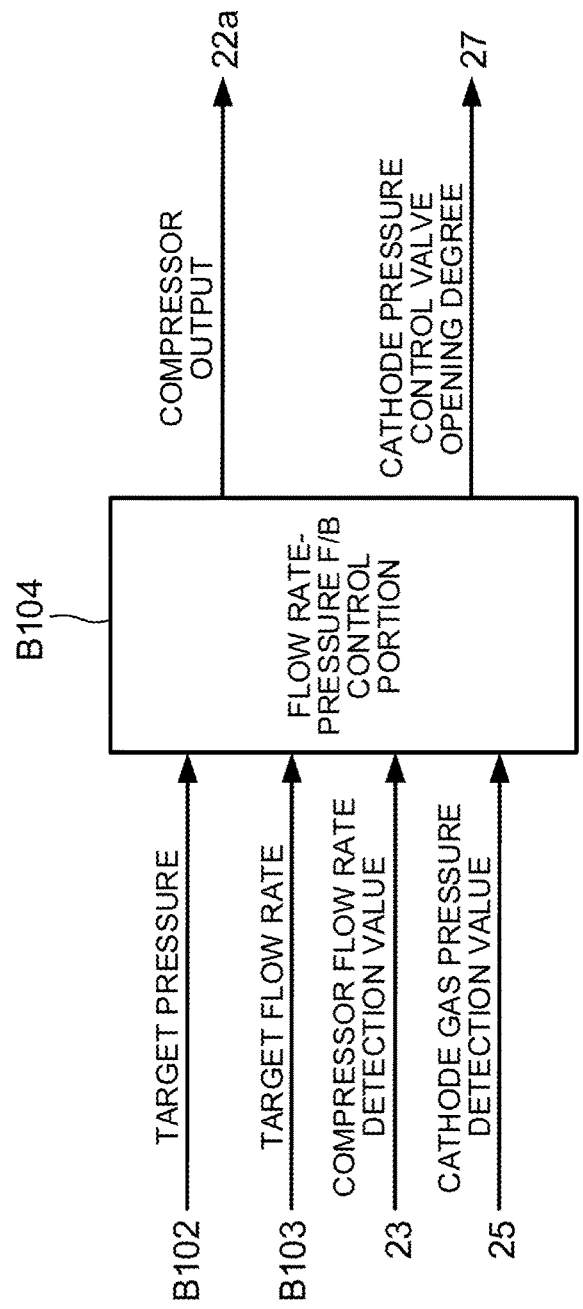
FIG. 12 is a view to describe a function of a flow rate-pressure F/B control portion.

FIG. 12 is a view to describe a function of the flow rate-pressure F/B control portion B104. As illustrated herein, the target pressure calculated by the target pressure calculation portion B102, the target flow rate calculated by the target flow rate calculation portion B103, the detection value of the cathode gas pressure, and the detection value of the compressor flow rate are input into the flow rate-pressure F/B control portion B104.

The flow rate-pressure F/B control portion B104 adjust the compressor output and the opening degree of the cathode pressure control valve 27 based on these input values.

In the present embodiment, the flow rate-pressure F/B control portion B104 adjusts the compressor output so that the compressor flow rate converges at the target flow rate. Further, the flow rate-pressure F/B control portion B104 adjusts the opening degree of the cathode pressure control valve 27 so that the cathode gas pressure converges at the target pressure.

Next will be described a control on the anode system.

Figure 13:
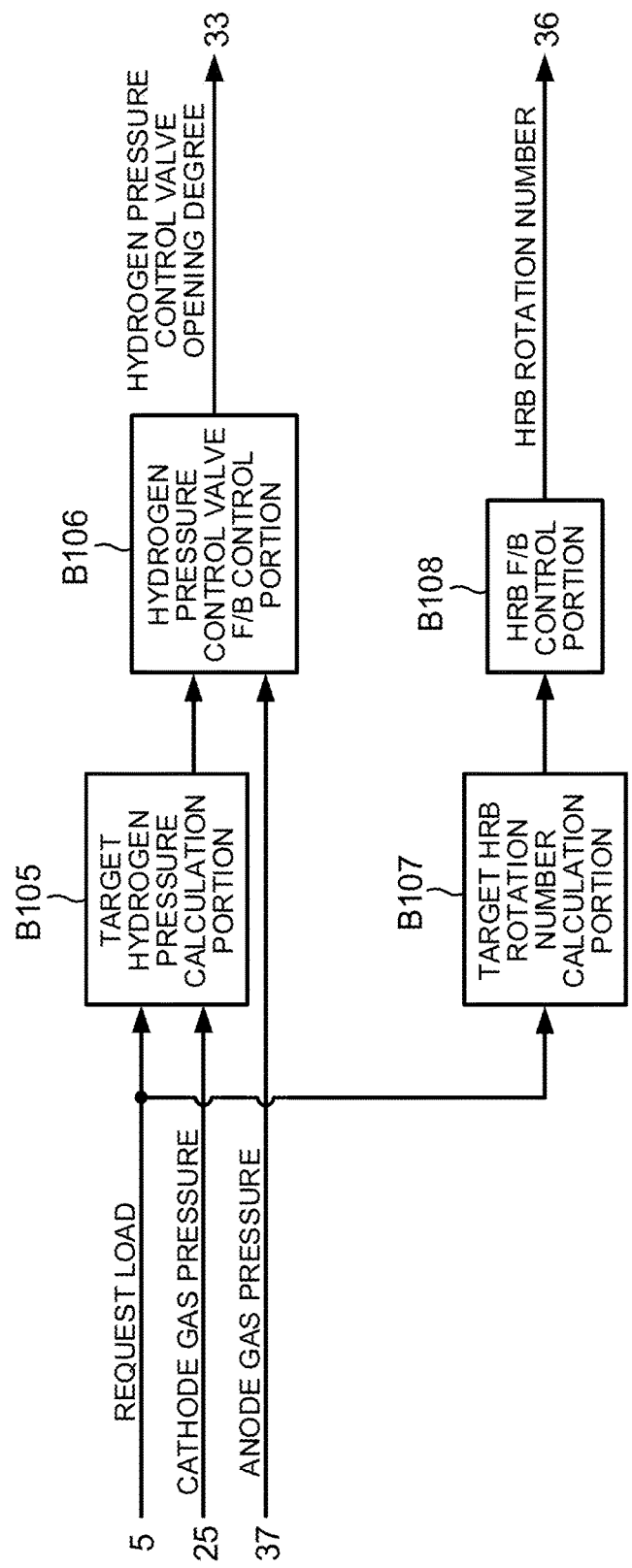
FIG. 13 is a block diagram to describe a control on an anode system.

FIG. 13 is a block diagram to describe the control on the anode system by the controller 200. As illustrated herein, the controller 200 includes a target hydrogen pressure calculation portion B105, a hydrogen pressure control valve F/B control portion B106, a target HRB (hydrogen recirculation blower) rotation number calculation portion B107, and an HRB F/B control portion B108.

As illustrated herein, the request load and the detection value of the cathode gas pressure are input into the target hydrogen pressure calculation portion B105. The target hydrogen pressure calculation portion B105 calculates a target anode gas pressure based on these input values by use of a predetermined target anode gas pressure map.

The target anode gas pressure thus calculated and the detection value of the anode gas pressure are input into the hydrogen pressure control valve F/B control portion B106. The hydrogen pressure control valve F/B control portion B106 controls the opening degree of the anode pressure control valve 33 so that the detection value of the anode gas pressure converges at the target anode gas pressure.

Further, the request load is input into the target HRB rotation number calculation portion B107. The target HRB rotation number calculation portion B107 calculates a target HRB rotation number as a target rotation number of the anode gas circulation blower 36 based on the input request load from a predetermined target HRB rotation number map.

Figure 14:
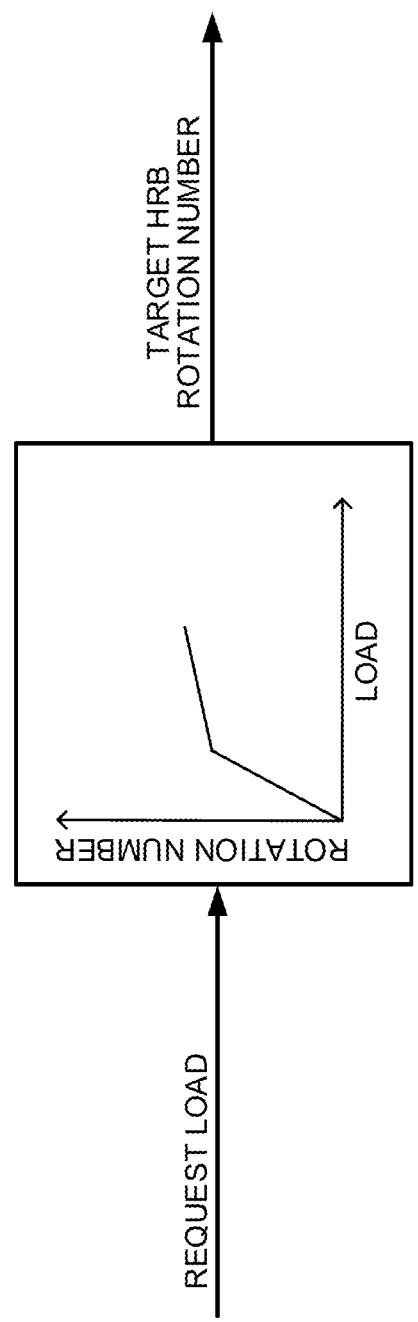
FIG. 14 illustrates one example of a target HRB rotation number map.

FIG. 14 illustrates one example of the target HRB rotation number map. As illustrated herein, as the request load increases, that is, as an anode gas amount to be consumed by electrochemical reaction in the fuel cell increases, the target HRB rotation number is set to a higher value.

Referring back to FIG. 13, the target HRB rotation number calculated by the target HRB rotation number calculation portion B107 is input into the HRB F/B control portion B108. The HRB F/B control portion B108 controls the rotation number of the anode gas circulation blower 36 based on the target HRB rotation number thus input.

The following describes the wet control of the fuel cell system 100 in the present embodiment more specifically.

Figure 15:
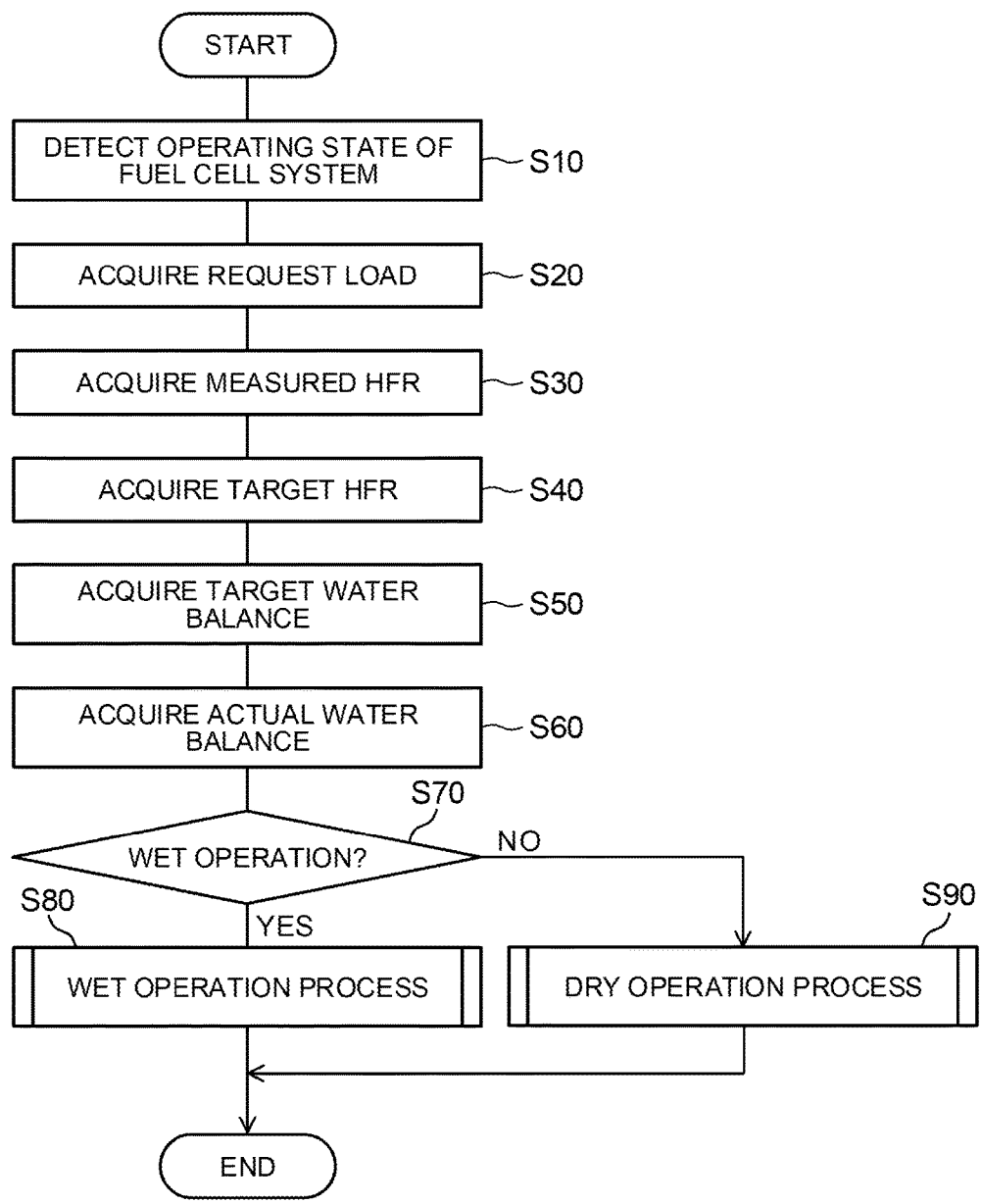
FIG. 15 is a flowchart to describe a wet control in the fuel cell system.

FIG. 15 is a flowchart to describe the wet control of the fuel cell system 100 in the present embodiment. The processing sequence of the control is performed repeatedly every predetermined control period.

In step S10, the controller 200 detects an operating state of the fuel cell stack 1. In the present embodiment, in response to an instruction from the controller 200, the air flow meter 23 detects a compressor flow rate and the cathode pressure sensor 25 detects a cathode gas pressure. Further, the opening degree sensor 29a detects an opening degree of the bypass valve 29. Further, the controller 200 calculates a detection value of the stack temperature based on a detection value of the coolant temperature by the inlet coolant temperature sensor 46 and the outlet coolant temperature sensor 47.

In step S20, the controller 200 acquires a request load of the loading device 5.

In step S30, the controller 200 acquires an HFR measured value correlated with the wet state of the electrolyte membrane, from the impedance measuring device 6.

In step S40, the target HFR calculation portion B1011 (see FIG. 4) of the controller 200 calculates a target HFR based on the request load.

In step S50, the target water balance calculation portion B1012 (see FIG. 4) of the controller 200 calculates a target water balance so that the HFR measured value converges at the target HFR, that is, calculates it based on an HFR deviation.

In step S60, the priority setting portion B1013 (see FIG. 5) of the controller 200 finds an actual water balance from the HFR measured value.

In step S70, the priority setting portion B1013 of the controller 200 determines whether or not the wet operation is performed. More specifically, as has been already described, the priority setting portion B1013 determines a magnitude relationship between the target water balance and the actual water balance, such that, if target water balance−actual water balance>0 is satisfied, the priority setting portion B1013 determines that the wet operation is performed, and if not, that is, when target water balance−actual water balance≤0 is satisfied, the priority setting portion B1013 determines that the wet operation is not performed.

When it is determined in S70 that the wet operation is performed, the controller 200 performs a wet operation process in step S80. Further, when it is determined in S70 that the wet operation is not performed, the controller 200 performs the dry operation in step S90.

The following describes flows of the wet operation and the dry operation.

Figure 16:
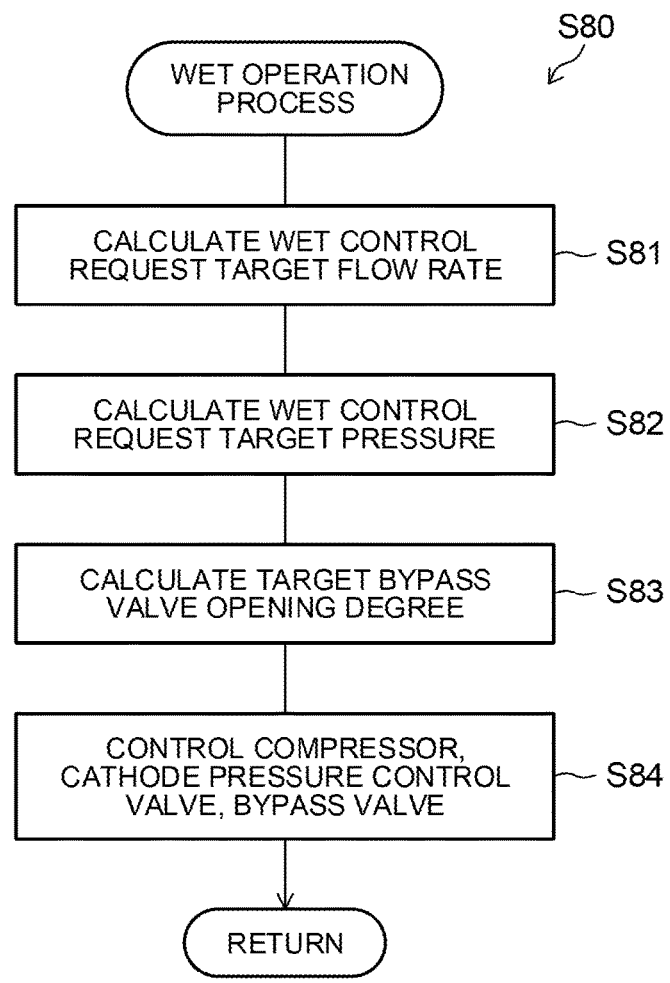
FIG. 16 is a flowchart to describe a flow of the wet operation.

FIG. 16 is a flowchart to describe the flow of the wet operation performed in step 80.

In step S81, the wet control request target flow rate calculation portion B1015 (see FIG. 5) calculates a wet control request target flow rate. As has been already described in FIG. 5, the wet control request target flow rate calculation portion B1015 calculates the wet control request target flow rate based on the target water balance, the stack temperature, the atmospheric pressure detection value as the cathode gas pressure, and the value of 0 as the bypass valve opening degree.

Accordingly, in order to perform the wet operation, the wet control request target flow rate calculation portion B1015 calculates a wet control request target flow rate on the premise that the cathode gas pressure is lowest and the bypass valve opening degree is lowest. That is, the wet control request target flow rate is calculated as a minimum value that most contributes to controlling the fuel cell to the wet side.

In step S82, the wet control request target pressure calculation portion B1014 calculates a wet control request target pressure. As has been already described in FIG. 5, the wet control request target pressure calculation portion B1014 calculates the wet control request target pressure based on the target water balance, the stack temperature, the detection value of the compressor flow rate, and the value of 0 as the bypass valve opening degree.

That is, the wet control request target pressure calculation portion B1014 calculates the wet control request target pressure by use of the detection value adjusted to the lower side (toward the wet side of the fuel cell stack 1) by the wet control request target flow rate, as the compressor flow rate, while the bypass valve opening degree is set to zero that is lowest.

In step S83, the target bypass valve opening degree calculation portion B1016 calculates a target bypass valve opening degree. As has been already described in FIG. 5, the target bypass valve opening degree calculation portion B1016 calculates the target bypass valve opening degree based on the target water balance, the stack temperature, the detection value of the compressor flow rate, and the detection value of the cathode gas pressure.

That is, the target bypass valve opening degree calculation portion B1016 calculates the target bypass valve opening degree so that an increasing amount of the bypass valve opening degree is set to a minimum on the premise that the fuel cell is controlled to the wet side by decreasing the compressor flow rate and increasing the cathode gas pressure.

In step S84, the controller 200 controls the compressor 22, the cathode pressure control valve 27, and the bypass valve 29 based on the wet control request target flow rate calculated in step S81, the wet control request target pressure calculated in step S82, and the target bypass valve opening degree calculated in step S83.

More specifically, the target flow rate calculation portion B103 (see FIG. 11) calculates a target flow rate according to the logic described in FIG. 11, based on the wet control request target flow rate calculated in step S81 and so on. The flow rate-pressure F/B control portion B104 (see FIG. 12) adjusts a compressor output based on the calculated target flow rate and the compressor flow rate detection value.

Further, the target pressure calculation portion B102 (see FIG. 9) calculates a target pressure according to the logic described in FIG. 9, based on the wet control request target pressure calculated in step S82. The flow rate-pressure F/B control portion B104 (see FIG. 12) adjusts a cathode pressure control valve opening degree based on the calculated target pressure and the cathode gas pressure detection value.

Further, the membrane wetness F/B control portion B101 (see FIG. 3) adjusts a bypass valve opening degree based on the target bypass valve opening degree calculated in step S83.

Accordingly, the compressor flow rate determined by the target flow rate based on the wet control request target flow rate calculated on the premise that the cathode gas pressure is the atmospheric pressure detection value and the bypass valve opening degree is zero is a first-priority wet control parameter having a first priority as the wet control parameter.

In the meantime, as has been already described in FIG. 11, the target flow rate is set as a maximum value among the wet control request target flow rate, the oxygen partial pressure securing lower limit flow rate, the pressure securing request flow rate, and the purge hydrogen dilution request flow rate, and therefore, the target flow rate does not become lower than the oxygen partial pressure securing lower limit flow rate. Accordingly, the compressor flow rate is adjusted so as not to become lower than the oxygen partial pressure securing lower limit flow rate in the present embodiment.

Further, the cathode gas pressure determined by the target pressure based on the wet control request target pressure calculated on the premise that the compressor flow rate is the detection value and the bypass valve opening degree is zero is a second-priority wet control parameter having a second priority as the wet control parameter.

In the meantime, the target pressure is set so as not to exceed the excessive pressure-increase prevention upper limit pressure according to the logic described in FIG. 9. Accordingly, in the present embodiment, the cathode gas pressure is adjusted so as not to exceed the excessive pressure-increase prevention upper limit pressure.

Further, the bypass valve opening degree determined by the target bypass valve opening degree calculated on the premise that the compressor flow rate is the detection value and the cathode gas pressure is the detection value is a third-priority wet control parameter having a lowest priority as the wet control parameter.

Here, FIG. 17 illustrates a table showing a relationship between priorities of the wet control parameters in the wet operation and increase/decrease tendencies of the wet control parameters.

As illustrated herein, in the wet operation, the compressor output is decreased so that the compressor flow rate as the first-priority wet control parameter decreases. Further, after the compressor flow rate is decreased, the opening degree of the cathode pressure control valve 27 is decreased so that the cathode gas pressure as the second-priority wet control parameter increases. Furthermore, after the compressor flow rate is decreased and the cathode gas pressure is increased, the bypass valve opening degree as the third-priority wet control parameter is increased so that the bypass flow rate increases.

That is, in the wet operation, the control on the fuel cell stack 1 to the wet side is performed in the priority order from decreasing of the compressor flow rate, increasing of the cathode gas pressure, and increasing of the bypass valve opening degree.

Figure 18:
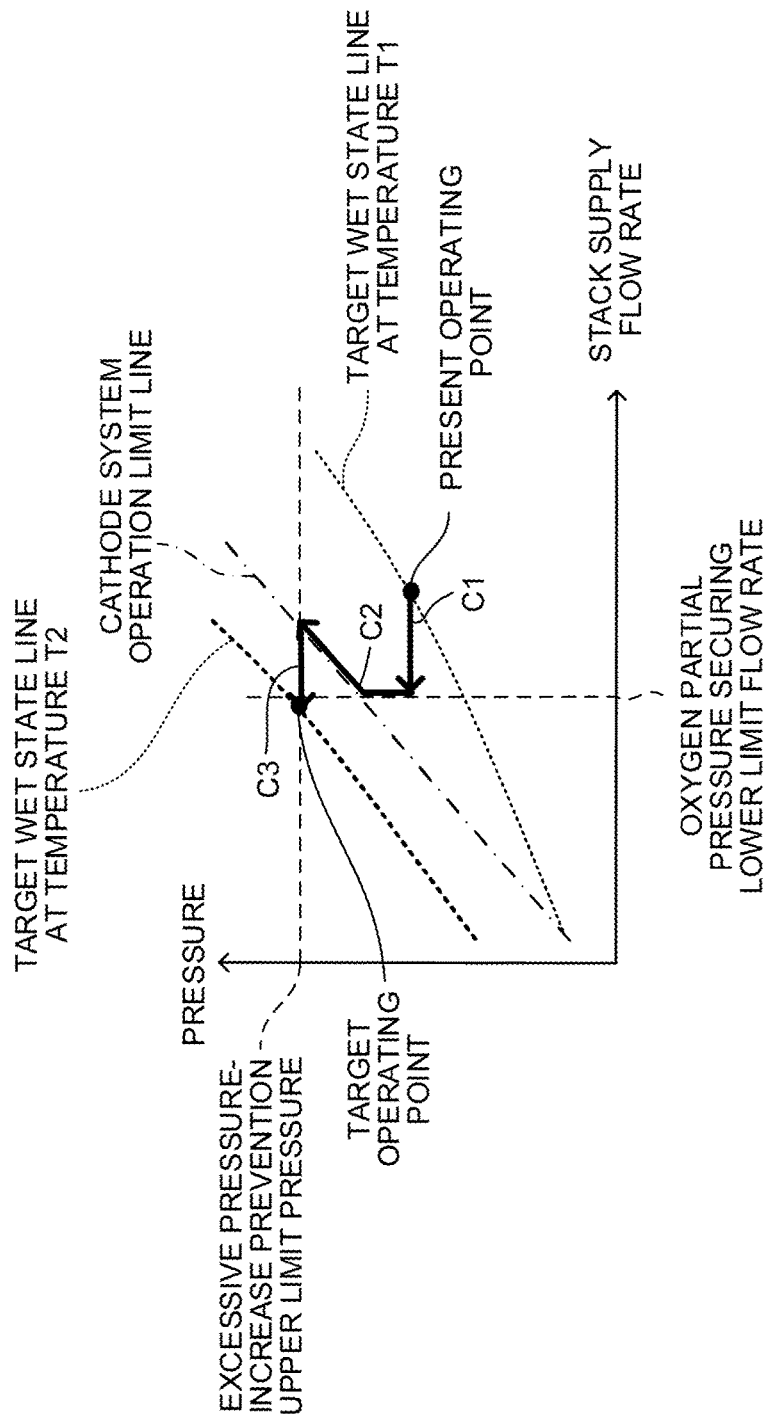
FIG. 18 is a view to describe one example of a state change of the fuel cell system in the wet operation at a given request load.

FIG. 18 is a view to describe one example of a state change of the fuel cell system 100 in the wet operation at a given request load. Here, a linear arrow indicated by a reference sign "C1" herein indicates the operation to decrease the compressor flow rate by decreasing the output of the compressor 22. That is, as apparent from FIG. 18, if the bypass valve opening degree is uniform in the operation, the stack flow rate decreases.

Further, a bent arrow indicated by a reference sign "C2" indicates the operation to decrease the opening degree of the cathode pressure control valve 27. A linear arrow indicated by a reference sign "C3" indicates the operation to increase the bypass valve opening degree, namely, the operation to increase the bypass flow rate.

Further, in FIG. 18, a target wet state line at the time when the stack temperature is a temperature T1 and a target wet state line at the time when the stack temperature is a temperature T2 are indicated by dotted lines (T1<T2). Further, in FIG. 18, a cathode system operation limit line indicative of a minimum value of the stack supply flow rate with respect to the cathode gas pressure, determined from the viewpoint of surging prevention in the compressor 22, is indicated by an alternate long and short dash line. Further, an oxygen partial pressure securing lower limit flow rate and an excessive pressure-increase prevention upper limit pressure are indicated by broken lines.

FIG. 18 assumes that the wet operation is performed so that an operating point of the fuel cell system 100 is shifted from a present operating point to a target operating point. Here, the present operating point is in a state where the stack temperature is a given temperature T1 and a target wet state corresponding to the temperature T1 is satisfied. Note that the target wet state is a state where the water balance deviation ΔQ is zero.

In the meantime, the target operating point is an operating point at which the stack temperature is the temperature T2 (>T1) and a target wet state corresponding to the temperature T2 is satisfied. Accordingly, in order to shift the operating point of the fuel cell system 100 from the present operating point to the target operating point, the wet operation is performed so that the fuel cell is wetted more.

In the wet operation, first, as indicated by the arrow C1, the compressor flow rate is decreased from the present operating point. As has been already described, the target flow rate is adjusted so as not to become lower than the oxygen partial pressure securing lower limit flow rate (see FIG. 11), so that the compressor flow rate (the stack supply flow rate) stops decreasing at the oxygen partial pressure securing lower limit flow rate.

Then, as indicated by the arrow C2, the cathode gas pressure is increased. As has been already described, the target pressure is adjusted so as not to exceed the excessive pressure-increase prevention upper limit pressure (see FIG. 9), so that the cathode gas pressure stops increasing at the excessive pressure-increase prevention upper limit pressure. Here, in the arrow C2, the cathode gas pressure is adjusted so as not to exceed the excessive pressure-increase prevention upper limit pressure, so that the cathode gas pressure is restrained from increasing excessively.

Particularly, in the operation to increase the cathode gas pressure, the compressor flow rate also increases so that the operating point is maintained on the cathode system operation limit line. However, when the compressor flow rate keeps increasing, the compressor output becomes high, which causes such a concern that the fuel efficiency decreases due to an increase of power consumption. Further, when the compressor flow rate increases, the stack supply flow rate increases, which might cause the fuel cell stack 1 to be dry excessively.

In order to deal with such concerns, in the present embodiment, the cathode gas pressure is restricted so as not to exceed the excessive pressure-increase prevention upper limit pressure, thereby making it possible to restrain an increase of power consumption of the compressor 22 and occurrence of excessive drying of the fuel cell stack 1.

Further, as indicated by the arrow C3, the bypass valve opening degree is increased so that the stack supply flow rate is decreased, and thus, the fuel cell is controlled toward the wet side, thereby resulting in that the fuel cell system 100 reaches the target operating point.

As such, in the present embodiment, in the wet operation, the operation to decrease the compressor flow rate is performed in priority to the operation to increase the bypass valve opening degree. When the bypass valve opening degree is increased before the compressor flow rate is decreased to a flow rate lower limit, the target flow rate is set to be high from the viewpoint of securing the stack supply flow rate, so that the compressor output excessively increases. This causes an increase of power consumption and occurrence of noise, but the present embodiment can restrain such a situation.

Further, in the present embodiment, the operation to increase the cathode gas pressure is performed in priority to the operation to increase the bypass valve opening degree. When the bypass valve opening degree is increased in a state where the cathode gas pressure is low, the stack supply flow rate decreases, so that an output voltage of the fuel cell stack 1 decreases and variations in cell voltage of the fuel cell increase, but the present embodiment can restrain such a situation.

Figure 19:
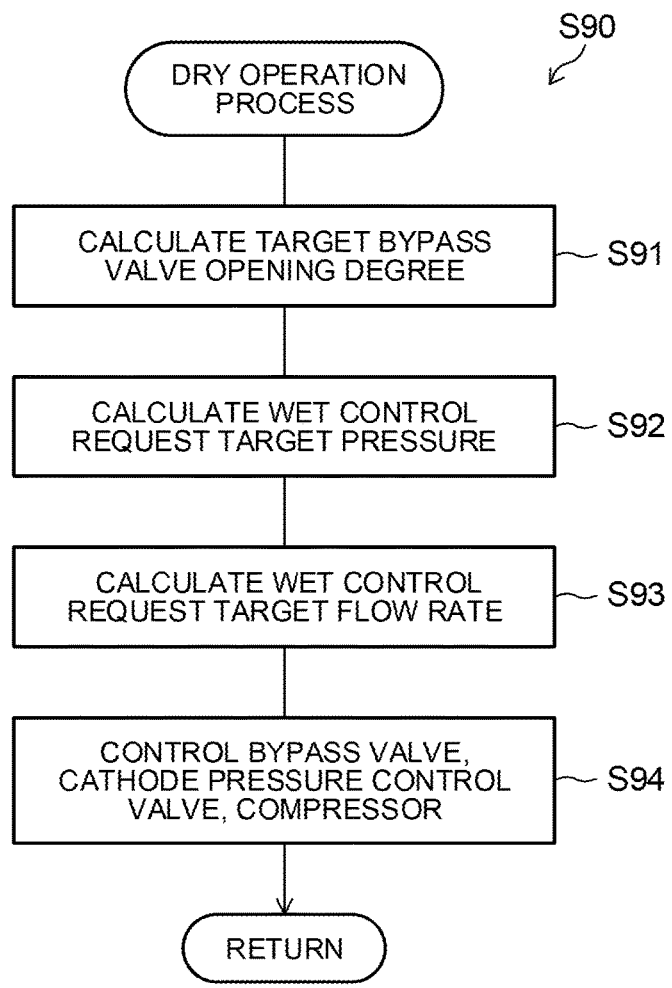
FIG. 19 is a flowchart to describe a flow of a dry operation.

FIG. 19 is a flowchart to describe the flow of the dry operation performed in step S90 in FIG. 15.

In step S91, the target bypass valve opening degree calculation portion B1016 calculates a target bypass valve opening degree. As has been already described in FIG. 5, in the dry operation, the target bypass valve opening degree calculation portion B1016 calculates the target bypass valve opening degree based on the target water balance, the stack temperature, the flow rate minimum value as the compressor flow rate, and the atmospheric pressure detection value as the cathode gas pressure.

That is, in order to perform the dry operation, the target bypass valve opening degree calculation portion B1016 calculates the target bypass valve opening degree on the premise that the compressor flow rate is the flow rate minimum value and the cathode gas pressure is the atmospheric pressure detection value. That is, the target bypass valve opening degree calculation portion B1016 calculates the target bypass valve opening degree so that the bypass valve opening degree is set to be as small as possible.

In step S92, the wet control request target pressure calculation portion B1014 calculates a wet control request target pressure. As has been already described in FIG. 5, in the dry operation, the wet control request target pressure calculation portion B1014 calculates the wet control request target pressure based on the target water balance, the stack temperature, the flow rate minimum value as the compressor flow rate, and the detection value as the bypass valve opening degree.

That is, the wet control request target pressure is calculated based on the flow rate minimum value that has the smallest contribution to the control on the fuel cell stack 1 toward the dry side, as the compressor flow rate, and the detection value adjusted to the lower side (toward the dry side of the fuel cell stack 1) by the target bypass valve opening degree, as the bypass valve opening degree.

In step S93, the wet control request target flow rate calculation portion B1015 calculates a wet control request target flow rate. As has been already described in FIG. 5, in the dry operation, the wet control request target flow rate calculation portion B1015 calculates the wet control request target flow rate based on the target water balance, the stack temperature, the detection value of the bypass valve opening degree, and the detection value of the cathode gas pressure.

That is, the wet control request target flow rate calculation portion B1015 calculates the wet control request target flow rate based on the detection value of the bypass valve opening degree that has been already adjusted to the lower side (toward the dry side of the fuel cell stack 1) by the target bypass valve opening degree, and the detection value of the cathode gas pressure that has been already adjusted to the lower side (toward the dry side of the fuel cell stack 1) by the wet control request target pressure.

In step S94, the controller 200 controls the bypass valve 29, the cathode pressure control valve 27, and the compressor 22 based on the target bypass valve opening degree calculated in step S91, the wet control request target pressure calculated in step S82, and the wet control request target flow rate calculated in step S93. Note that a concrete control mode is the same as that in step S84.

More specifically, the membrane wetness F/B control portion B101 adjusts the bypass valve opening degree based on the target bypass valve opening degree calculated in step S91 (see FIGS. 3 and 5). Further, the target pressure calculation portion B102 calculates a target pressure according to the logic described in FIG. 9, based on the wet control request target pressure calculated in step S92. Then, the flow rate-pressure F/B control portion B104 adjusts the opening degree of the cathode pressure control valve 27 based on the target pressure.

Further, the target flow rate calculation portion B103 calculates a target flow rate according to the logic described in FIG. 11 based on the wet control request target flow rate calculated in step S93. Then, the flow rate-pressure F/B control portion B104 adjusts the compressor output based on the target flow rate.

Accordingly, in the dry operation, the bypass valve opening degree determined by the target bypass valve opening degree calculated on the premise that the compressor flow rate is the flow rate minimum value and the cathode gas pressure is the atmospheric pressure detection value is a first-priority dry control parameter having a first priority as the wet control parameter.

Further, in the dry operation, the cathode gas pressure determined by the target pressure based on the wet control request target pressure calculated on the premise that the bypass valve opening degree is the detection value and the compressor flow rate is the flow rate minimum value is a second-priority dry control parameter having a second priority as the wet control parameter.

Further, in the dry operation, the compressor flow rate determined by the target flow rate based on the wet control request target flow rate calculated on the premise that the bypass valve opening degree is the detection value and the cathode gas pressure is the detection value is a third-priority dry control parameter having a lowest priority as the wet control parameter.

Here, FIG. 20 illustrates a table showing a relationship between priorities of the wet control parameters in the dry operation and increase/decrease tendencies of the wet control parameters.

As illustrated herein, in the dry operation, the bypass valve opening degree as the first-priority dry control parameter is decreased so that the bypass flow rate decreases. Further, after the bypass valve opening degree is decreased, the opening degree of the cathode pressure control valve 27 is increased so that the cathode gas pressure as the second-priority dry control parameter decreases. Furthermore, after the bypass valve opening degree is decreased and the cathode gas pressure is decreased, the compressor flow rate as the third-priority dry control parameter is increased.

Thus, in the dry operation, the bypass valve opening degree is decreased in priority to decreasing of the cathode gas pressure and increasing of the compressor flow rate. Hereby, in the dry operation, it is possible to restrain the cathode gas pressure from being decreased in the state where the bypass valve opening degree is relatively large. Accordingly, the compressor 22 is restrained from being controlled so that its output is increased in order to increase the compressor flow rate due to the decrease of the cathode gas pressure, thereby consequently making it possible to further restrain an increase of power consumption and occurrence of noise.

Next will be described a time flow of one example of the wet control in the fuel cell system 100.

Figure 21:
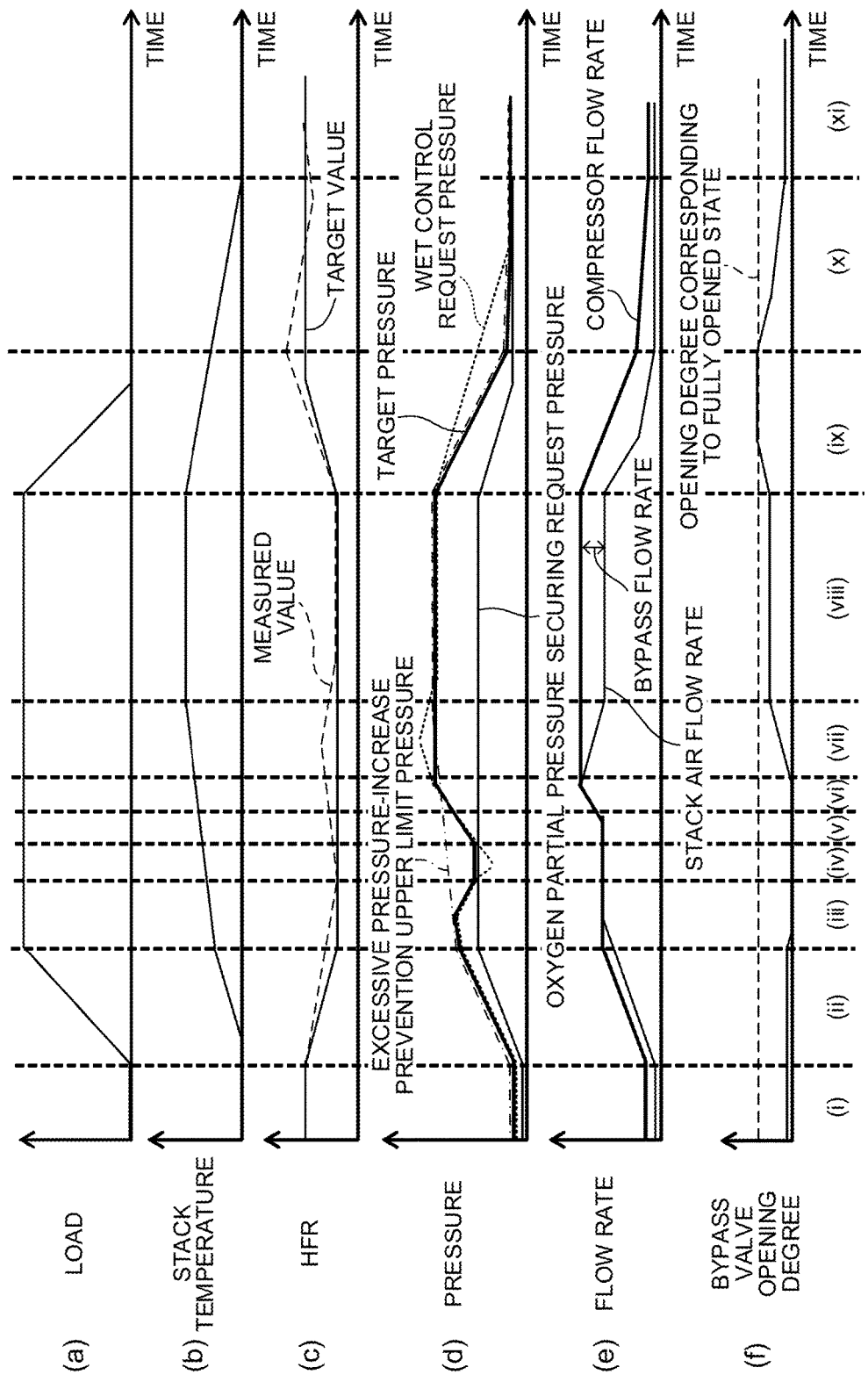
FIG. 21 is a time chart to describe a time flow of the wet control in the fuel cell system.

FIG. 21 is a time chart to describe the time flow of one example of the wet control in the fuel cell system 100. Particularly, FIG. 21(a) to FIG. 21(f) respectively indicate changes with time of the load (indicating, for example, a power supply amount or an output current to each load), the stack temperature, the HFR, the pressure, the flow rate, and the bypass valve opening degree of the fuel cell system 100.

Note that, in FIG. 21(c), the target HFR is indicated by a continuous line, and the HFR measured value is indicated by a broken line. Further, in FIG. 21(d), the target pressure is indicated by a bold continuous line, the oxygen partial pressure securing request pressure is indicated by a thin continuous line, the wet control request target pressure is indicated by a broken line, and the excessive pressure-increase prevention upper limit pressure is indicated by an alternate long and short dash line. Note that, for simplification of description, the membrane pressure difference permissible upper limit pressure is not reflected in the figure. Further, in FIG. 21(e), the compressor flow rate is indicated by a bold continuous line, and the stack supply flow rate is indicated by a thin continuous line. Further, in FIG. 21(f), the detection value of the bypass valve opening degree is indicated by a continuous line, and an opening degree corresponding to a fully opened state of the bypass valve 29 is indicated by a broken line.

In a time zone (i) illustrated herein, the fuel cell system 100 is in an idle state. Here, the idle state is a state where power supply amounts from the fuel cell stack 1 to accessories such as a drive motor and the compressor motor 22a are generally zero, a power generation amount of the fuel cell stack 1 is relatively small, and generated power is supplied to a battery and the like (not shown).

In the time zone (i), request power generation (a request load) to the fuel cell stack 1 is small, so a request to wet the fuel cell stack 1 is low. Accordingly, in order to keep a state (a dry state) where the fuel cell stack 1 is not relatively wet, the target HFR is set to a relatively high constant value. Accordingly, the wet control is performed in a state where the target water balance is set to a relatively small constant value.

In the meantime, in the time zone (i), the excessive pressure-increase prevention upper limit pressure that is an upper limit of the cathode gas pressure according to the logic described in FIG. 9 is set to a relatively low value because the request load and the stack temperature are low (FIG. 21(a), (b), (d)). Accordingly, the cathode gas pressure takes a relatively low value corresponding to the excessive pressure-increase prevention upper limit pressure. Further, as a result of the wet control, the bypass valve opening degree is set to a relatively small constant value (FIG. 21(f)).

In a time zone (ii), the idle state is finished and the request load and the stack temperature increase (FIG. 21(a), (b)), so that the load of the fuel cell system 100 increases. Along with this, the request load and the stack temperature increase, so that the target HFR decreases (FIG. 21(c)). As illustrated herein, in the time zone (ii), the HFR measured value exceeds the target HFR value. Accordingly, an actual water balance becomes lower than the target water balance, so that the wet operation is started so as to achieve a target wet state.

Here, in the wet operation in the time zone (ii), it is necessary to secure the oxygen partial pressure securing lower limit flow rate described in FIG. 11 to a value to some extent along with the increase of the request load. Accordingly, as understood from the logic illustrated in FIG. 11, even if the wet control request target flow rate is decreased, the target flow rate cannot be decreased. Accordingly, in order to perform the wet operation, the compressor flow rate as the first-priority wet control parameter is not decreased, but the operation to increase the cathode gas pressure as the second-priority wet control parameter having a priority next to the compressor flow rate is performed (see the target pressure in FIG. 21(d)) according to the logic described in FIG. 5. In the meantime, along the logic of FIG. 9, the target pressure is controlled to be not more than the excessive pressure-increase prevention upper limit pressure, so that the cathode gas pressure is increased while being restricted to the excessive pressure-increase prevention upper limit pressure as its upper limit.

Further, in the time zone (ii), by increasing the cathode gas pressure to the excessive pressure-increase prevention upper limit pressure, the fuel cell stack 1 can be shifted to the wet side to the extent requested, so the bypass valve opening degree as the third-priority wet control parameter is maintained.

In a time zone (iii), the increase of the load of the fuel cell system 100 is finished. Along with this, the target HFR is settled. Due to the wet operation from the time zone (ii), wetting progresses, so that the actual water balance becomes higher than the target water balance. Accordingly, in the time zone (iii), the dry operation is started so as to achieve the target wet state.

Here, in the dry operation in the time zone (iii), along the logic described in FIG. 5, the bypass valve opening degree as the first-priority dry control parameter to be operated with top priority is set to zero (FIG. 21(f)). Then, the cathode gas pressure as the second-priority dry control parameter is decreased to supplement the dry operation in which the bypass valve opening degree is set to zero (FIG. 21(d)). Hereby, the cathode gas pressure is decreased to the oxygen partial pressure securing request pressure as a lower limit described in FIG. 9. Due to the operations, the fuel cell stack 1 can be shifted to the dry side to the extent requested, so that the compressor flow rate as the third-priority dry control parameter is maintained (FIG. 21(e)).

In a time zone (iv), the HFR measured value is settled at the target HFR (FIG. 21(c)) as a result of the dry operation in the time zone (iii), so that the cathode gas pressure is decreased to the oxygen partial pressure securing request pressure as its lower limit (FIG. 21(d)).

In a time zone (v), the HFR measured value increases along with the increase of the stack temperature. Hereby, the actual water balance becomes lower than the target water balance, so that the wet operation is started. In the wet operation, along the logic of FIG. 11, in terms of the compressor flow rate as the first-priority wet control parameter, the target flow rate is not decreased from the viewpoint of securing the oxygen partial pressure securing lower limit flow rate. Accordingly, in the wet operation, the target pressure is increased in order to increase the cathode gas pressure as the second-priority wet control parameter.

Subsequently, in a time zone (vi), the cathode gas pressure increases due to the wet operation in the time zone (v). Accordingly, along the logic of FIG. 11, the pressure securing request flow rate increases, so that the target flow rate consequently increases, thereby resulting in that the compressor flow rate increases.

In a time zone (vii), along with the increase of the cathode gas pressure due to the wet operation in the time zone (v), the cathode gas pressure reaches the excessive pressure-increase prevention upper limit pressure again. Accordingly, along the logic of FIG. 9, the cathode gas pressure does not increase further. However, since the fuel cell stack 1 does not reach the target wet state yet, increasing of the bypass valve opening degree as the third-priority wet control parameter is started (FIG. 21(*f*)). Due to the increase of the bypass valve opening degree, the HFR measured value decreases to approach the target HFR (FIG. 21(*c*)).

In a time zone (viii), the HFR measured value decreases continuously from the time zone (vii) and is settled at the target HFR (FIG. 21(*c*)). Further, the load is settled at a high load state and the stack temperature is settled at a high temperature state (FIGS. 21(*a*) and (*b*)).

In a time zone (ix), the load and the stack temperature decrease. Along with the decrease of the load, the excessive pressure-increase prevention upper limit pressure decreases (FIG. 21(*d*)), so that the cathode gas pressure is decreased while being restricted to the excessive pressure-increase prevention upper limit pressure, according to the logic of FIG. 9. Further, along with the decrease of the cathode gas pressure, the HFR measured value further increases (the fuel cell stack 1 is further shifted to the dry side).

Accordingly, the wet operation is performed again. Here, along the logic of FIG. 11, the compressor flow rate as the first-priority wet control parameter is restricted to the oxygen partial pressure securing lower limit flow rate, so that the compressor flow rate does not decrease. Further, the cathode gas pressure as the second-priority wet control parameter is restricted to the excessive pressure-increase prevention upper limit pressure, and therefore, along the logic of FIG. 9, the cathode gas pressure does not increase. Accordingly, in the wet operation, the bypass valve opening degree as the third-priority wet control parameter is further increased to an opening degree corresponding to a fully opened state (FIG. 21(*f*)).

Then, in a time zone (x), along with the decrease of the stack temperature and the wet operation in the time zone (ix), the HFR measured value decreases (FIG. 21(*c*)). As a result, wetting of the fuel cell stack 1 progresses, so that the actual water balance becomes higher than the target water balance. Accordingly, the dry operation is performed. In the dry operation, the bypass valve opening degree as the first-priority dry control parameter is decreased (FIG. 21(*f*)). Further, in the time zone (x), along with the decrease of the stack temperature, the excessive pressure-increase prevention upper limit pressure decreases (FIG. 21(*d*)). Accordingly, the cathode gas pressure restricted to the excessive pressure-increase prevention upper limit pressure also decreases.

In a time zone (xi), decreasing of the bypass valve opening degree (the wet operation) is finished, so that the fuel cell system 100 shifts to the idle state again.

Next will be described the effect of a control method of the fuel cell system 100 according to the present embodiment described above.

The present embodiment provides a wet state control method for the fuel cell system 100 in which cathode gas is supplied to the fuel cell stack 1 as a fuel cell while the cathode gas partially bypasses the fuel cell stack 1, and the wet state control method controls the wet state of the fuel cell stack 1 by adjusting the wet control parameters. In the wet state control method for the fuel cell system 100, the wet control parameters include a bypass valve opening degree, a cathode gas pressure, and a compressor flow rate as a cathode gas flow rate, and at the time when the fuel cell stack 1 is controlled to the wet side (in the wet operation), the cathode gas pressure and the compressor flow rate are adjusted in priority to adjustment of the bypass valve opening degree.

Particularly, the present embodiment provides a wet state control device including: the fuel cell stack 1; the compressor 22 as a cathode gas supply device configured to supply cathode gas to the cathode system 1, 21, 26, 28 including the fuel cell stack 1; the bypass passage 28 via which the cathode gas supplied from the compressor 22 to the fuel cell stack 1 partially bypasses the fuel cell stack 1; the bypass valve 29 provided in the bypass passage 28; the membrane wetness F/B control portion B101 as a bypass valve opening degree adjusting device configured to adjust an opening degree of the bypass valve 29; the cathode pressure control valve 27 as a cathode gas pressure adjusting device configured to adjust a cathode gas pressure; the compressor motor 22*a* as a cathode gas flow rate adjusting device configured to adjust a cathode gas flow rate supplied from the compressor 22 to the cathode system 1, 21, 26, 28; the impedance measuring device 6 as a wet-state acquisition device configured to acquire a wet state of the fuel cell stack 1; the opening degree sensor 29*a* as a bypass valve opening degree acquisition device configured to acquire an opening degree of the bypass valve 29; the cathode pressure sensor 25 as a cathode gas pressure acquiring portion configured to acquire the cathode gas pressure; the air flow meter 23 as a cathode gas flow rate acquiring portion configured to acquire a compressor flow rate; and the priority setting portion B1013 configured to set priorities of adjustment of the bypass valve opening degree by the membrane wetness F/B control portion B101, adjustment of the cathode gas pressure by the cathode pressure control valve 27, and adjustment of the compressor flow rate by the compressor motor 22*a*.

In the wet state control device, when the fuel cell stack 1 is controlled to the wet side, the priority setting portion B1013 sets the priorities such that the adjustment of the cathode gas pressure by the cathode pressure control valve 27 and the adjustment of the cathode gas flow rate by the compressor motor 22*a* are prioritized over the adjustment of the bypass valve opening degree by the membrane wetness F/B control portion B101.

Hereby, in the wet operation, the cathode gas pressure and the compressor flow rate are adjusted in priority to the adjustment of the bypass valve opening degree. Accordingly, in the wet operation, it is possible to restrain excess or shortage of the stack supply flow rate, caused when the bypass valve opening degree is adjusted in a state where the compressor flow rate and the cathode gas pressure are not adjusted, thereby making it possible to maintain the wet state of the fuel cell stack 1 suitably.

Further, in the present embodiment, at the time when the dry operation to control the fuel cell stack 1 to the dry side is performed, the bypass valve opening degree is adjusted in priority to the adjustment of the compressor flow rate and the cathode gas pressure.

Particularly, in the wet state control device for the fuel cell system 100 in the present embodiment, in the dry operation, the priority setting portion B1013 gives priority to the adjustment of the bypass valve opening degree by the membrane wetness F/B control portion B101 over at least one of the adjustment of the cathode gas pressure by the cathode pressure control valve 27 and the adjustment of the cathode gas flow rate by the compressor motor 22*a*.

Hereby, in the dry operation, it is possible to restrain the compressor flow rate and the cathode gas pressure from being adjusted in a state where the bypass valve opening degree is not adjusted. Accordingly, in the dry operation, it is possible to restrain excess or shortage of the stack supply flow rate, caused when the compressor flow rate and the cathode gas pressure are adjusted in the state where the bypass valve opening degree is not adjusted, thereby making it possible to maintain the wet state of the fuel cell stack 1 suitably.

Further, the present embodiment provides a wet state control method for the fuel cell system 100 in which cathode gas is supplied to the fuel cell stack 1 as a fuel cell while the cathode gas partially bypasses the fuel cell stack 1, and the wet state control method for the fuel cell system 100 controls the wet state of the fuel cell stack 1 by adjusting wet control parameters so that the wet state of the fuel cell stack 1 approaches a target wet state. In the wet state control method, the wet control parameters include a bypass valve opening degree, a cathode gas pressure, and a compressor flow rate as a cathode gas flow rate, and the wet operation is performed such that decreasing of the compressor flow rate as the cathode gas flow rate and increasing of the cathode gas pressure are performed, and the bypass valve opening degree is increased so as to supplement the control on the fuel cell stack 1 to the wet side by the decreasing of the compressor flow rate and the increasing of the cathode gas pressure.

Hereby, in the wet operation, the increasing of the bypass valve opening degree is performed preferentially, and the decreasing of the compressor flow rate and the increasing of the cathode gas pressure are performed in a supplemental manner. Accordingly, in the wet operation, the wet state of the fuel cell stack 1 is surely made closer to the target wet state, and it is possible to restrain excess or shortage of the stack supply flow rate, caused when the bypass valve opening degree is increased in a state where the decreasing of the compressor flow rate and the increasing of the cathode gas pressure are not performed, thereby making it possible to maintain the wet state of the fuel cell stack 1 suitably.

Particularly, in the wet operation, the decreasing of the compressor flow rate is performed in priority to the increasing of the bypass valve opening degree, thereby making it possible to restrain such a situation that, as a result of increasing the bypass valve opening degree before the compressor flow rate decreases, the target flow rate is set to be high and the compressor output excessively increases, thereby causing an increase of power consumption and occurrence of noise.

Further, in the wet operation, the increasing of the cathode gas pressure is performed in priority to the increasing of the bypass valve opening degree. This accordingly makes it possible to restrain such a situation that, as a result of increasing the bypass valve opening degree before the cathode gas pressure increases, the supply flow rate of the cathode gas to the fuel cell stack 1 decreases so that an output voltage of the fuel cell stack 1 decreases and variations in cell voltage of the fuel cell increase.

Further, in the wet state control method of the present embodiment, the wet operation to control the fuel cell stack 1 to the wet side is performed such that: the controller 200 calculates a wet control request target flow rate of the compressor 22 based on the atmospheric pressure detection value as a minimum value of the cathode gas pressure and a minimum value (=0) of the bypass valve opening degree, calculates a wet control request target pressure of the cathode gas based on a compressor flow rate detection value and the minimum value of the bypass valve opening degree, and calculates a bypass valve opening degree target value based on a cathode gas pressure detection value and the compressor flow rate detection value; and the controller 200 adjusts the compressor flow rate, the cathode gas pressure, and the bypass valve opening degree so that the compressor flow rate, the cathode gas pressure, and the bypass valve opening degree approach the wet control request target flow rate, the wet control request target pressure, and the target bypass valve opening degree, respectively.

Hereby, in the wet operation, operation priorities are determined in the order from the decreasing of the compressor flow rate, the increasing of the cathode gas pressure, and the increasing of the bypass valve opening degree. Accordingly, it is possible to more easily realize a configuration in which the bypass flow rate is not adjusted in a state where the compressor flow rate and the cathode gas pressure are not adjusted.

Further, in the wet state control method according to the present embodiment, in the dry operation to control the fuel cell stack 1 to the dry side, an operation to decrease the bypass valve opening degree is performed, and increasing of the compressor flow rate and decreasing of the cathode gas pressure are performed so as to supplement the operation to decrease the bypass valve opening degree.

Hereby, in the dry operation, the compressor flow rate increases after the bypass valve opening degree decreases, thereby making it possible to more surely prevent excessive supply of the cathode gas to the fuel cell stack 1 that can occur when the compressor flow rate increases before the bypass valve opening degree decreases.

Further, in the dry operation, the cathode gas pressure decreases after the bypass valve opening degree decreases, thereby making it possible to restrain the cathode gas pressure from being decreased in a state where the bypass flow rate is not decreased sufficiently. This restrains such a situation that the compressor output is controlled to increase in order to increase the compressor flow rate due to a decrease of the cathode gas pressure, thereby consequently making it possible to further restrain an increase of power consumption and occurrence of noise.

Further, in the wet state control method in the present embodiment, the dry operation to control the fuel cell stack 1 to the dry side is performed such that: the controller 200 calculates a target value of the bypass valve opening degree based on the atmospheric pressure detection value as a minimum value of the cathode gas pressure and the flow rate minimum value as a minimum value of the cathode gas flow rate, calculates a wet control request target pressure based on a detection value of the bypass valve opening degree and the flow rate minimum value, and calculates a wet control request target flow rate based on the detection value of the bypass valve opening degree and a detection value of the cathode gas pressure; and the controller 200 adjusts the bypass valve opening degree, the cathode gas pressure, and the cathode gas flow rate so that the bypass valve opening degree, the cathode gas pressure, and the cathode gas flow rate approach the target bypass valve opening degree, the wet control request target pressure, and the wet control request target flow rate, respectively.

Hereby, in the dry operation, operation priorities are determined in the order from decreasing of the bypass valve opening degree, decreasing of the cathode gas pressure, and the compressor flow rate. This makes it possible to more easily achieve a configuration that performs the decreasing of the cathode gas pressure and increasing of the compressor flow rate after the bypass valve opening degree is decreased.

Further, in the wet state control method according to the present embodiment, the cathode gas pressure is restricted so as not to exceed the excessive pressure-increase prevention upper limit pressure as a pressure upper limit.

This restrains the cathode gas pressure from increasing uselessly and the output of the compressor 22 from increasing due to a continuous increase of the compressor flow rate, thereby making it possible to contribute to improvement of fuel efficiency and restraint of noise.

Further, in the wet state control method according to the present embodiment, the excessive pressure-increase prevention upper limit pressure is calculated based on the request load and the stack temperature as a temperature of the fuel cell.

Hereby, in a high load state and the like, the target pressure becomes higher, so that the excessive pressure-increase prevention upper limit pressure is set to be relatively high, and in the meantime, in a low load state and the like, the target pressure becomes low, so that the excessive pressure-increase prevention upper limit pressure can be set to be relatively low. Particularly, when the excessive pressure-increase prevention upper limit pressure is set to be relatively low in a low load state or at a low temperature, the cathode gas pressure is restrained from increasing excessively, so that the compressor output can be decreased, thereby making it possible to contribute to improvement of fuel efficiency and restraint of noise.

Note that the excessive pressure-increase prevention upper limit pressure may be calculated based on the target wet state such as the target HFR or the target water balance. Hereby, it is possible to adjust an upper limit of the cathode gas pressure suitably according to the target wet state for the fuel cell stack 1.

Further, in the control method of the fuel cell system 100 in the present embodiment, the compressor flow rate is adjusted so as not to become lower than a flow rate lower limit (the oxygen partial pressure securing lower limit flow rate) as its lower limit.

This makes it possible to prevent such a situation that the compressor flow rate becomes excessively small in the wet operation and the like so that the compressor flow rate supplied to the fuel cell stack 1 becomes insufficient and a power generation state becomes unstable.

Particularly, the oxygen partial pressure securing lower limit flow rate as the flow rate lower limit is set so as to satisfy a supply flow rate (the stack supply flow rate) of the cathode gas that is requested by the fuel cell stack 1.

This makes it possible to more surely secure a stack supply flow rate necessary to satisfy a power generation amount corresponding to the request load, for example, thereby making it possible to maintain the oxygen concentration in the fuel cell stack 1 suitably and to maintain a power generation state appropriately.

Further, the flow rate lower limit may be set so as to be able to prevent local water clogging in the fuel cell stack 1. Hereby, the wet state of the fuel cell is maintained further more suitably, and excessive drying and flooding are prevented, thereby making it possible to contribute to the maintenance of a better power generation state.

The embodiment of the present invention has been described above, but the embodiment exemplifies a part of application examples of the present invention and is not intended to limit the technical scope of the present invention to the specific configuration of the embodiment.

For example, in the embodiment, in the wet operation, the wet control is performed such that the compressor flow rate is set as the first-priority wet control parameter, the cathode gas pressure is set as the second-priority wet control parameter, and the bypass valve opening degree is set as the third-priority wet control parameter.

However, the present invention is not necessarily limited to the priorities of the wet control parameters in the embodiment, provided that at least one of the compressor flow rate and the cathode gas pressure is set as a wet control parameter having priority over the bypass valve opening degree. That is, the compressor flow rate may be set as the first-priority wet control parameter, the bypass valve opening degree may be set as the second-priority wet control parameter, and the cathode gas pressure may be set as the third-priority wet control parameter. Further, the cathode gas pressure may be set as the first-priority wet control parameter, the bypass valve opening degree may be set as the second-priority wet control parameter, and the compressor flow rate may be set as the third-priority wet control parameter.

Further, in the present embodiment, as described in FIG. 5, at the time when the wet operation is performed, the compressor flow rate with a maximum control amount is prioritized as the first-priority wet control parameter, and the cathode gas pressure and the bypass valve opening degree are set as the second-priority or third-priority wet control parameter. However, how to set priorities is not limited to this, and for example, in the wet operation, a priority relationship with time may be set to the wet control parameters such that the adjustment of the compressor flow rate as the first-priority wet control parameter is first performed, then, the adjustment of the cathode gas pressure as the second-priority wet control parameter is performed, and finally, the adjustment of the bypass valve opening degree is performed. Note that, in the dry operation, a priority relationship with time can be also set to the wet control parameters.

Further, the priorities of the wet control parameters in the dry operation are also not necessarily limited to the embodiment.

Further, the wet control parameters may include other parameters, for example, the HRB rotation number and the like, in addition to the compressor flow rate and the cathode gas pressure.

Further, the constituents of the fuel cell system 100 of the present embodiment are not limited to those in the embodiment. For example, instead of a solenoid valve, the cathode pressure control valve 27 may be configured as a diaphragm portion having a fixed opening degree, such as an orifice. Further, a turbine driven by receiving the cathode gas from the cathode gas discharge passage 26 or the anode gas from the high-pressure tank 31 may be attached to the compressor 22.

Further, the HFR measured value in the present embodiment may be corrected by the stack temperature.

The embodiments can be combined as appropriate.

The present application claims a priority of Japanese Patent Application No. 2016-051340 filed with the Japan Patent Office on Mar. 15, 2016, and all the contents of which are hereby incorporated by reference.

The invention claimed is:

1. A wet state control method for a fuel cell system in which cathode gas is supplied to a fuel cell while the cathode gas partially bypasses the fuel cell, the wet state control method being for controlling a wet state of the fuel cell by adjusting wet control parameters,
   wherein the wet control parameters include at least a bypass valve opening degree, a cathode gas pressure, and a cathode gas flow rate, and
   the method comprising:
   controlling the fuel cell to a wet side such that at least either one of the cathode gas flow rate and the cathode gas pressure is adjusted in priority to adjustment of the bypass valve opening degree.

2. The wet state control method for the fuel cell system, according to claim 1, the method comprising:

controlling the fuel cell to a dry side such that the bypass valve opening degree is adjusted in priority to adjustment of at least either one of the cathode gas flow rate and the cathode gas pressure.

3. A wet state control method for a fuel cell system in which cathode gas is supplied to a fuel cell while the cathode gas partially bypasses the fuel cell, the wet state control method being for controlling a wet state of the fuel cell by adjusting wet control parameters so that the wet state of the fuel cell approaches a target wet state,
wherein the wet control parameters include at least a bypass valve opening degree, a cathode gas pressure, and a cathode gas flow rate, and
the method comprising:
controlling the fuel cell to a wet side such that:
at least either one of decreasing of the cathode gas flow rate and increasing of the cathode gas pressure is performed; and
the bypass valve opening degree is increased so as to supplement the control on the fuel cell to the wet side by the at least either one of the decreasing of the cathode gas flow rate and the increasing of the cathode gas pressure.

4. The wet state control method for the fuel cell system, according to claim 3, the method comprising:
controlling the fuel cell to the wet side such that:
a wet control request target flow rate of the cathode gas is calculated based on a minimum value of the cathode gas pressure and a minimum value of the bypass valve opening degree;
a wet control request target pressure of the cathode gas is calculated based on a detection value of the cathode gas flow rate and the minimum value of the bypass valve opening degree;
a target value of the bypass valve opening degree is calculated based on a detection value of the cathode gas pressure and the detection value of the cathode gas flow rate; and
the cathode gas flow rate, the cathode gas pressure, and the bypass valve opening degree are adjusted to approach the wet control request target flow rate, the wet control request target pressure, and the target value of the bypass valve opening degree, respectively.

5. The wet state control method for the fuel cell system, according to claim 3, the method comprising:
controlling the fuel cell to a dry side such that:
an operation to decrease the bypass valve opening degree is performed; and
at least either one of increasing of the cathode gas flow rate and decreasing of the cathode gas pressure is performed so as to supplement the operation to decrease the bypass valve opening degree.

6. The wet state control method for the fuel cell system, according to claim 5, the method comprising:
controlling the fuel cell to the dry side such that:
a target value of the bypass valve opening degree is calculated based on a minimum value of the cathode gas pressure and a minimum value of the cathode gas flow rate;
a wet control request target pressure of the cathode gas is calculated based on a detection value of the bypass valve opening degree and the minimum value of the cathode gas flow rate;
a wet control request target flow rate of the cathode gas is calculated based on the detection value of the bypass valve opening degree and a detection value of the cathode gas pressure; and
the bypass valve opening degree, the cathode gas pressure, and the cathode gas flow rate are adjusted to approach the target value of the bypass valve opening degree, the wet control request target pressure, and the wet control request target flow rate, respectively.

7. The wet state control method for the fuel cell system, according to claim 3, the method comprising:
restricting the cathode gas pressure so that the cathode gas pressure does not exceed a pressure upper limit.

8. The wet state control method for the fuel cell system, according to claim 7, the method comprising:
calculating the pressure upper limit based on at least one of a request load, a temperature of the fuel cell, and a target wet state.

9. The wet state control method for the fuel cell system according to claim 3, the method comprising:
adjusting the cathode gas flow rate so as that the cathode gas flow rate does not become lower than a flow rate lower limit as a lower limit of the cathode gas flow rate.

10. The wet state control method for the fuel cell system, according to claim 9, the method comprising:
setting the flow rate lower limit so that a request of a fuel cell supply flow rate is satisfied, the fuel cell supply flow rate being a flow rate of the cathode gas supplied to the fuel cell.

11. The wet state control method for the fuel cell system, according to claim 9, the method comprising:
setting the flow rate lower limit so that local water clogging in the fuel cell is able to be prevented.

12. A wet state control device for a fuel cell system, the wet state control device comprising:
a fuel cell;
a cathode gas supply device configured to supply cathode gas to a cathode system including the fuel cell;
a bypass passage via which the cathode gas supplied from the cathode gas supply device to the fuel cell partially bypasses the fuel cell;
a bypass valve provided in the bypass passage;
a bypass valve opening degree adjusting device configured to adjust an opening degree of the bypass valve;
a cathode gas pressure adjusting device configured to adjust a cathode gas pressure;
a cathode gas flow rate adjusting device configured to adjust a cathode gas flow rate supplied from the cathode gas supply device to the cathode system;
a wet-state acquisition device configured to acquire a wet state of the fuel cell;
a bypass valve opening degree acquisition device configured to acquire an opening degree of the bypass valve;
a cathode gas pressure acquiring portion configured to acquire the cathode gas pressure;
a cathode gas flow rate acquiring portion configured to acquire the cathode gas flow rate; and
a priority setting portion configured to set priorities of adjustment of the bypass valve opening degree by the bypass valve opening degree adjusting device, adjustment of the cathode gas pressure by the cathode gas pressure adjusting device, and adjustment of the cathode gas flow rate by the cathode gas flow rate adjusting device, wherein
when the fuel cell is controlled to a wet side, the priority setting portion sets the priorities such that at least one of the adjustment of the cathode gas pressure by the cathode gas pressure adjusting device and the adjustment of the cathode gas flow rate by the cathode gas flow rate adjusting device is performed in priority to the adjustment of the bypass valve opening degree by the bypass valve opening degree adjusting device.

13. The wet state control device for the fuel cell system, according to claim 12, wherein
when the fuel cell is controlled to a dry side, the priority setting portion sets the priorities such that adjustment of a bypass flow rate by the bypass valve opening degree adjusting device is performed in priority to at least one of the adjustment of the cathode gas pressure by the cathode gas pressure adjusting device and the adjustment of the cathode gas flow rate by the cathode gas flow rate adjusting device.

\* \* \* \* \*